United States Patent Office 3,495,222
Patented Feb. 10, 1970

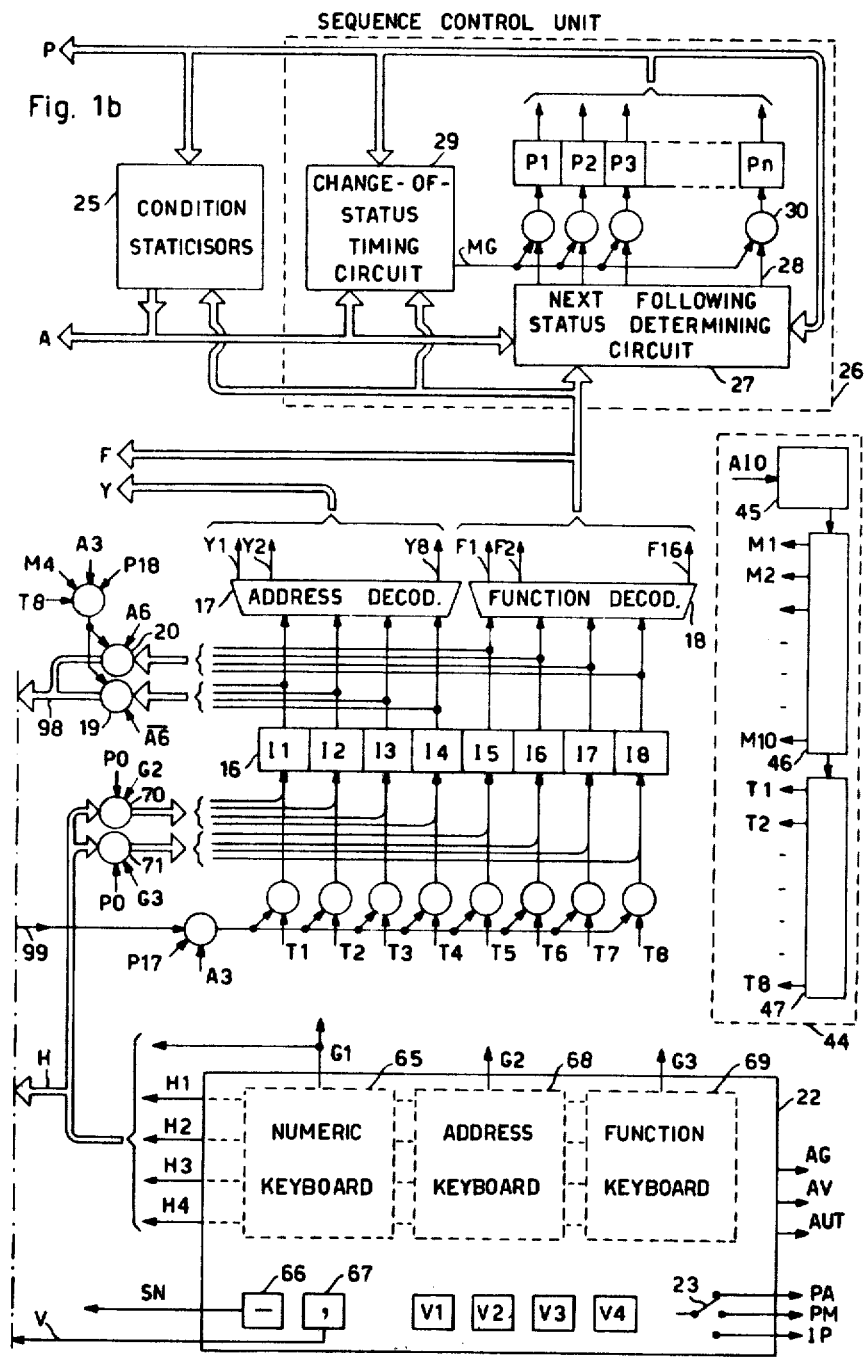

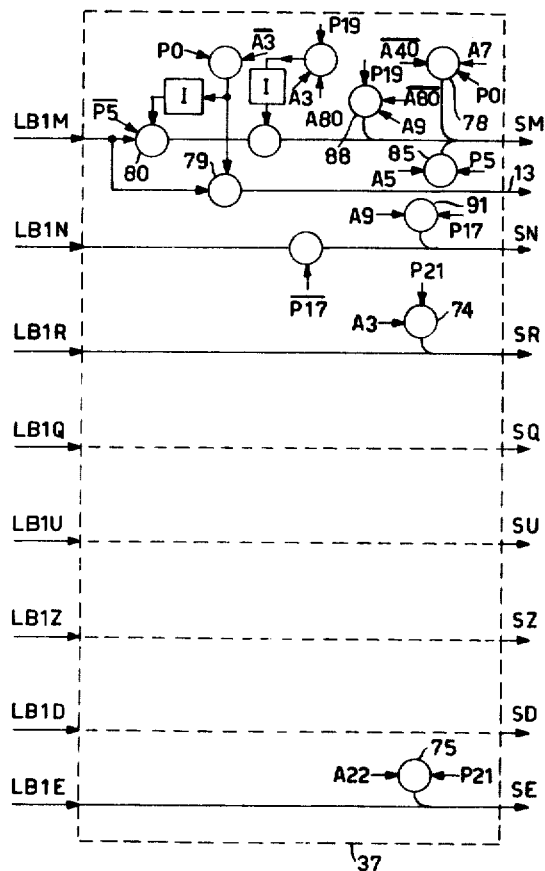
Fig. 5
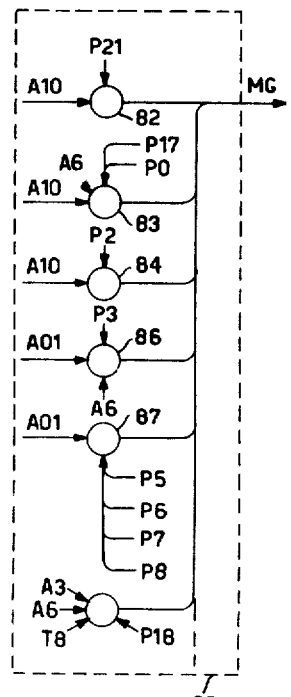
Fig. 7
Fig. 2
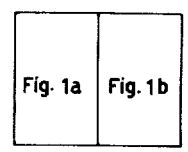
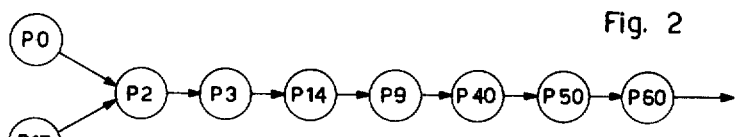
Fig. 8a
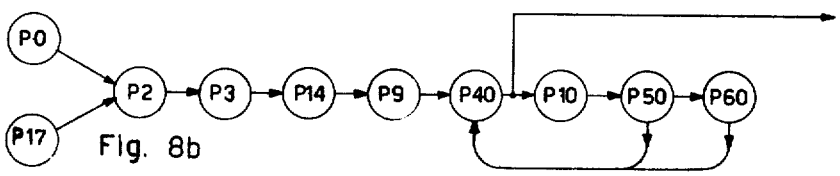
Fig. 8b

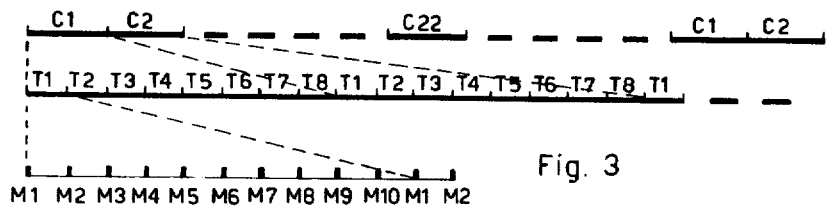
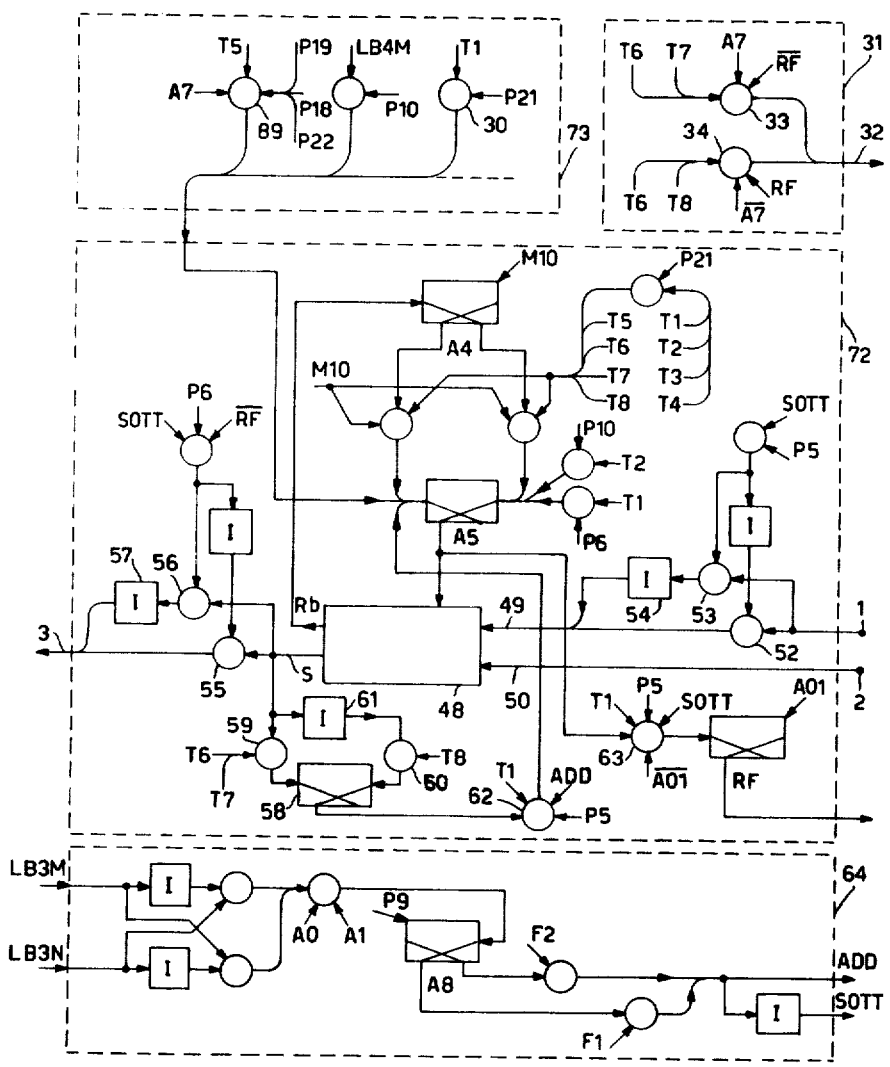
Fig. 3
Fig. 4

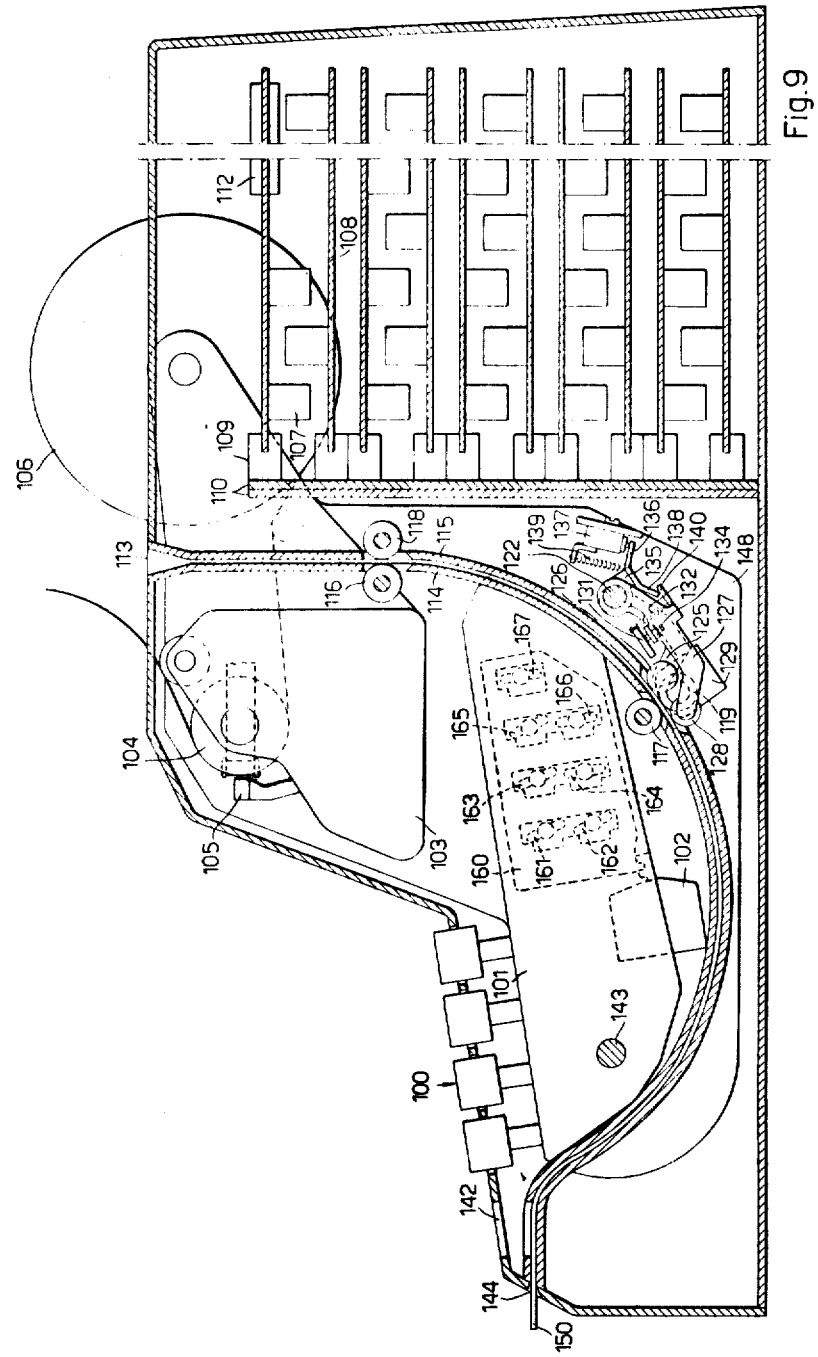

3,495,222
PROGRAM CONTROLLED ELECTRONIC COMPUTER
Pier Giorgio Perotto, Turin, and Giovanni De Sandre, Sacile, Italy, assignors to Ing. C. Olivetti & C., S.p.A., Ivrea, Italy, a corporation of Italy
Continuation of application Ser. No. 435,828, Mar. 1, 1965. This application Jan. 12, 1968, Ser. No. 697,537
Claims priority, application Italy, Mar. 2, 1964, 4,933/64; Jan. 2, 1965, 469/65
Int. Cl. G11b *13/00;* G06f *1/00*
U.S. Cl. 340—172.5   16 Claims

ABSTRACT OF THE DISCLOSURE

In an electronic computer provided with a storage for storing a program comprising a series of instructions, with an instruction staticisor wherein a predetermined instruction is transferred from said program storage under the control of said program, and with executing means automatically operative upon entering said instruction into said instruction staticisor for executing said instruction, a set of control keys is manually operable for entering said instruction into said instruction staticisor, the actuation of said control keys automatically making operative said executing means out of the control of said program, and program record cards may be manually introduced in a record processing device comprised in said computer for making available said program in said program storage.

---

This application is a continuation of application Ser. No. 435,828, filed Mar. 1, 1965.

The present invention relates to a program controlled electronic computer, for instance a so called desk-top computer.

The known desk-top electronic computers are not adapted for being controlled by a program stored in their internal memory, whereby the number and complexity of the different operations they can perform is strictly limited. Therefore they are no more powerful in processing data than the mechanical desk-top calculators.

Some known medium-size computers have the ability to simulate a desk-top calculator under the control of a simulator program stored therein.

However, the structure of these computers is so complex that operation as mechanical calculators is uneconomical and difficult.

Moreover in the known program controlled computers the operator is given no sufficient control over the operation of the computer during the automatic execution of the program.

These and other disadvantages are obviated by the computer according to the invention, which is provided with a storage for storing a program comprising a series of instructions and with means controlled by said program for transferring a predetermined instruction from said program storage to an instruction staticisor and with means automatically operative upon entering said instruction into said instruction staticisor for executing said instruction and is characterized in that it comprises a set of control keys for entering said instruction into said instruction staticisor, whereby the manual actuation of said control keys automatically makes said executing means operative out of the control of said program.

Therefore the computer may operate either automatically under the control of the stored program or manually under the control of the keyboard.

According to another feature of the invention, the computer, which is provided with a record processing device for reading records bearing said program and entering the read program into said program storage, is characterized in that said records are in form of cards each one containing a program, said record processing device being so associated with said program storage that by manually introducing a single record in said record processing device said program is made available in said program storage for controlling said computer.

According to another feature of the invention, the computer is provided with subroutine keys, manually operable to cause the computer to execute any selected subroutine of the program stored in the memory, whereby automatic execution of preselected subroutines may be included in the manual operation.

This feature, in connection with a novel association of said subroutine keys with said record processing device, gives the computer a great flexibility as if it were provided wtih an unlimited number of control keys.

Other objects, features and advantages of the invention will be apparent from the following description, made by way of example and not in a limiting sense, in connection with the accompanying drawings, wherein:

FIGS. 1a and 1b show a block diagram of the circuits of the computer according to an embodiment of the invention;

FIG. 2 shows how FIGS. 1a and 1b are to be composed;

FIG. 3 shows a time diagram of some clock signals of the computer according to FIGS. 1a and 1b;

FIG. 4 shows an adder used in an embodiment of the computer according to the invention;

FIG. 5 shows a circuit for controlling the tag bits used in the computer according to the invention;

Figure 10:
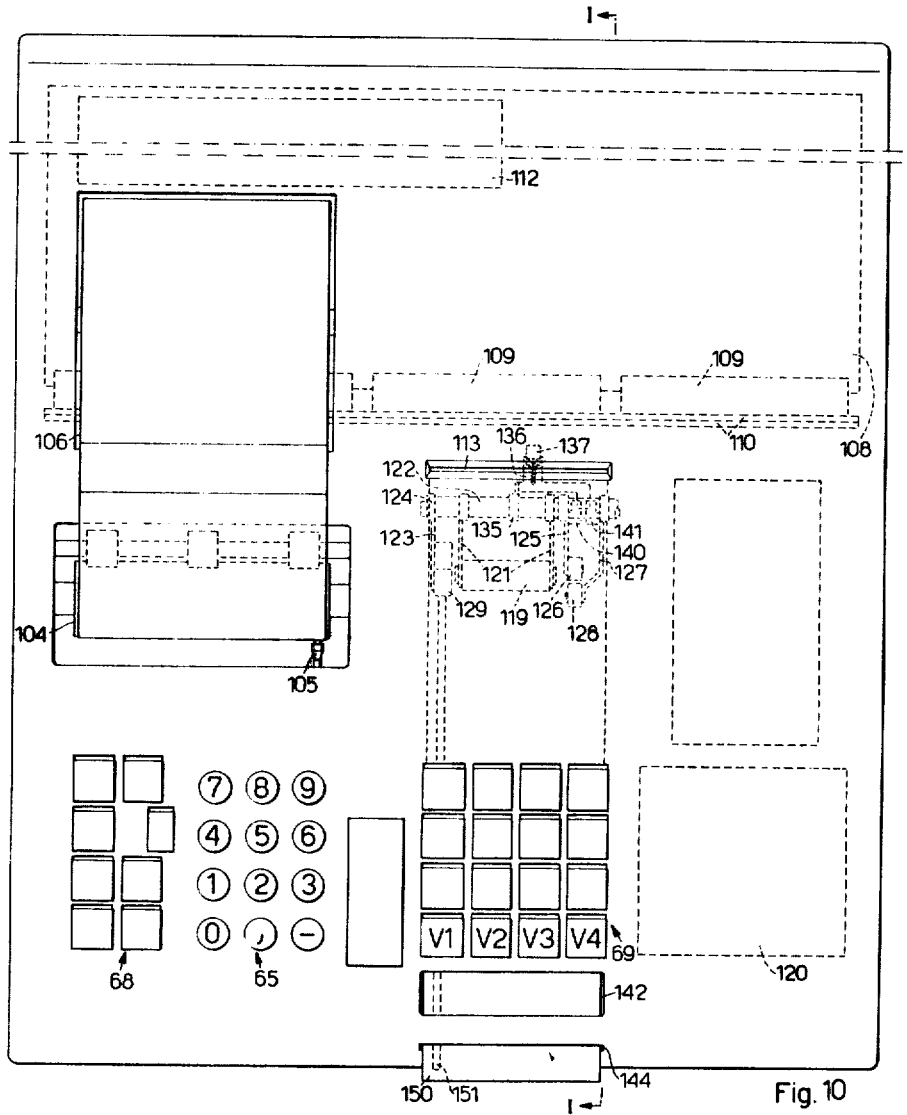
Figure 11A:
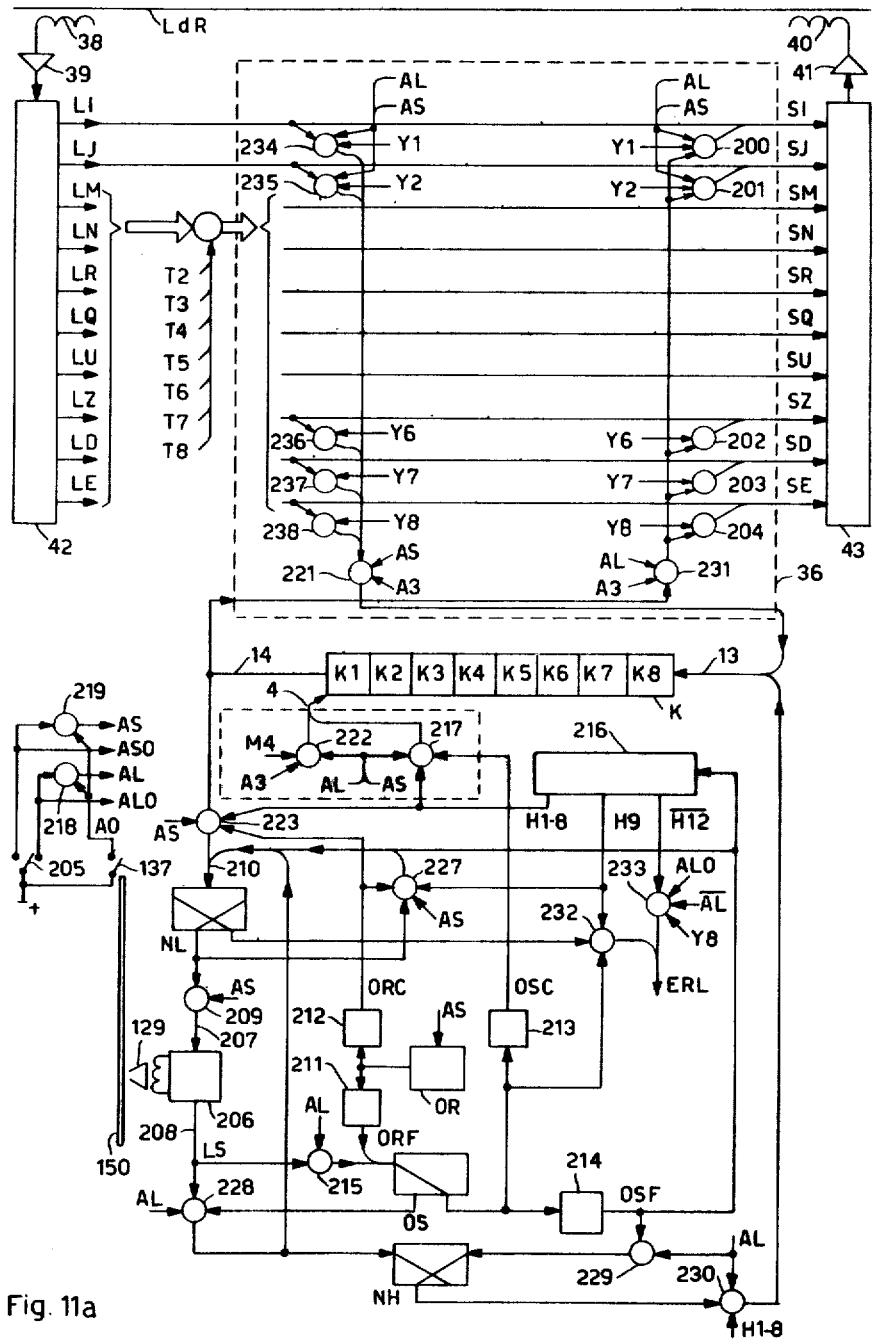
Figure 11B:
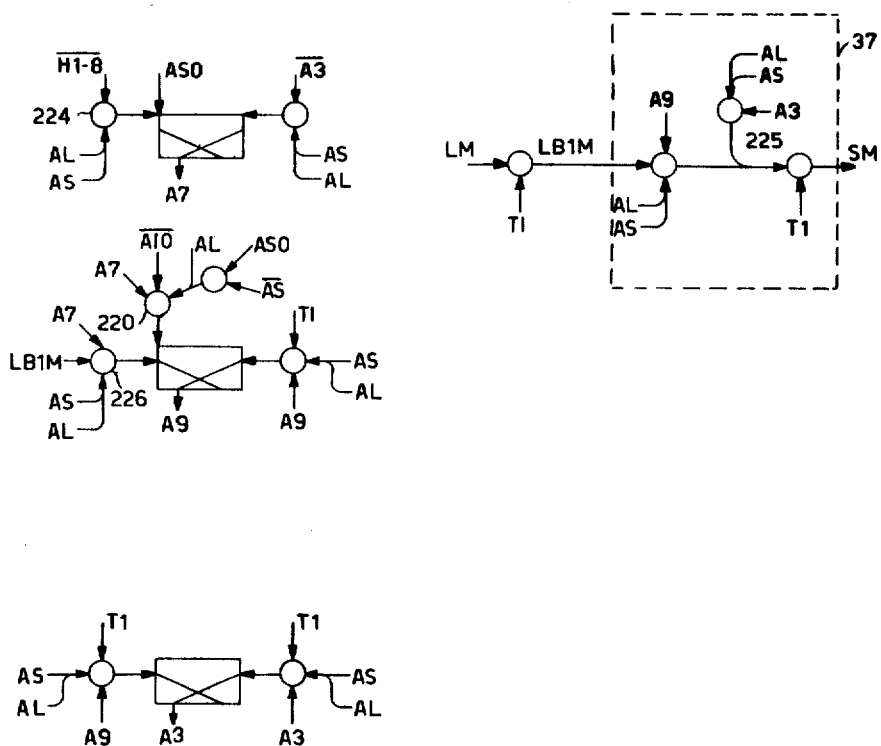
Figure 12:
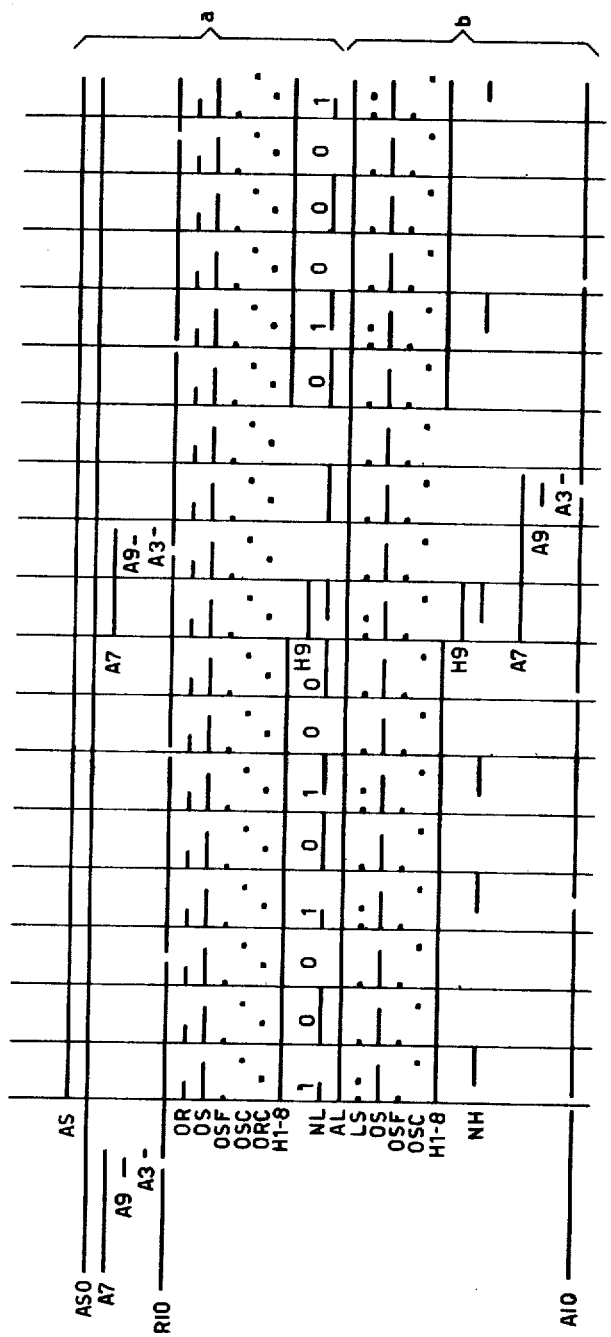

FIG. 7 partially shows a circuit for timing the switching from a status to the next following status in the computer according to the invention;

FIG. 8a is a diagram showing the sequence of statuses of the computer in the addition or subtraction according to an embodiment of the invention;

FIG. 8b is a diagram showing the sequence of statuses of the computer in the multiplication or division according an embodiment of the invention;

FIG. 9 shows a vertical section of an embodiment of the computer according to the invention;

FIG. 10 shows a top view of the computer of FIG. 9;

FIGS. 11a and 11b show some circuits of the computer involved in the card reading and writing operation;

FIG. 12 shows a time diagram of the card reading and recording operation.

General description

The computer comprises a storage made of a magnetostrictive delay line LDR including for instance ten registers I, J, M, N, R, Q, U, Z, D, E and provided with a reading transducer 38 feeding a reading amplifier 39 and with a writing transducer 40 fed by a writing amplifier 41.

Each memory register comprises for instance 22 decimal denominations, each one comprising eight binary denominations, whereby each register may store up to 22 eight-bit characters. Both the characters and the bits are processed in series. Therefore a train of 10·8·22 binary signals recirculates in the delay line LDR.

The ten first occurring binary signals represent the first bit of the first decimal denomination of the register R, N, M, J, I, Q, U, Z, D and E respectively, the ten next following binary signals represent the second bit of said first decimal denomination of said registers respectively, etc.

Assuming for instance said binary signals are recorded in the delay line so as to be spaced 1 microsecond from each other, the signals belonging to a certain register will be spaced 10 microseconds from each other. Otherwise stated, each register comprises a train of 8·22 binary signals spaced 10 microseconds from each other, the trains belonging to the several registers being diseplaced 1 microsecond from each other.

The reading amplifier 39 feeds a serial-to-parallel converter 42, which produces over ten separate outputs lines LR, LM, LN, LJ, LI, LE, LD, LQ, LU and LZ, ten simultaneous signals representing the ten bits stored in the same binary denomination of the same decimal denomination of the same decimal denomination of the ten registers respectively.

Therefore, at a given instant ten signals representing the first bit of the first decimal denomination of the ten registers are simultaneously present on said ten output lines; ten microseconds later, ten signals representing the second bit of the first decimal denomination are present on said output lines, etc.

Each group of ten signals simultaneously delivered on the output lines of the converter 42 after being processed is fed to a parallel-to-serial converter 43, which feeds the writing amplifier 41 with said ten signals restored in their previous serial order and spaced 1 microsecond from each other, whereby the transducer 40 writes in the delay lines said signals either unchanged or modified according to the operation of the computer, while maintaining their previous relative location. Therefore it is apparent that the single delay line LDR is equivalent, with respect to the external circuits which process its contents, to a group of ten delay lines working in parallel, each one containing a single register and provided with an output line LR, LM, LN, LJ, LI, LE, LD, LQ, LU and LZ respectively and with an input line SR, SM, SN, SJ, SI, SE, SD, SQ, SU and SZ respectively.

This interleaved arrangement of the signals in the delay line allows all the registers of the computer to be contained in a single delay line provided with a single reading transducer and a single writing transducer, whereby the ultimate cost of the memory does not exceed the cost of a delay line containing only one register. Moreover, as the pulse repetition frequency in the delay line is ten times greater than in the other circuits of the computer, it is possible to simultaneously attain a good utilization of the storage capacity of the delay line while using low speed switching circuits in the other parts of the computer, thus substantially reducing the cost of the machine.

As the delay line storage is cyclic in nature, the operation of the computer is divided into successive memory cycles, each cycle comprising twenty-two digit periods C1 to C22, and each digit period being divided into eight bit periods T1 to T8.

A clock pulse generator 44 produces on the output lines T1 to T8 successive clock pulse, each one having a duration which indicates a corresponding bit period, as shown in the time diagram of FIG. 3. Otherwise stated, the output terminal T1 is energized during the entire first bit period of each one of the twenty-two digit periods, the output terminals T2 is similarly energized during the entire second bit period of each one of the twenty-two digit periods, etc.

The clock pulse generator 44 is synchronized with the delay line LDR, as will be seen, in such a way that the beginning of the $n^{th}$ generic bit period of the $m^{th}$ generic digit period coincides with the instant in which the ten binary signals representing the ten bits read in the $n^{th}$ binary denomination of the $m^{th}$ decimal denomination of the ten memory registers begin to be available on the outputs lines of the serial-to-parallel converter 42. Said binary signals are staticized in the converter 42 for the entire duration of the corresponding bit period. During the same bit period the signals representing the ten bits produced by processing said ten bits read out of the delay line LDR are fed to the parallel-to-serial converter 43 and written in the delay line.

More particularly the generator 44 produces during each bit period ten pulses M1 to M10 (FIG. 3). The pulse M1 defines the reading time, that is the instant when the serial-to-parallel converter 42 begins to make available the bits pertaining to the present bit period, whereas the pulse M4 indicates the writing time, that is the instant when the processed bits are fed to the parallel-to-serial converter 43 for being written into the delay line LDR.

The generator 44 comprises an oscillator 45 which, when operative, feeds a pulse distributor 46 with pulses having the frequency of said pulses M1 to M10, a frequency divider 47 fed by said distributor being arranged to produce the clock pulses T1 to T8.

The oscillator 45 is operative only as long as a bistable device A10 (FIG. 6) remains energized, said bistable device being controlled by signals circulating in the delay line LDR, as will be seen.

Each decimal denomination of the memory LDR may contain either a decimal digit or an instruction. More particularly the registers I and J, which are designated as first and second instruction register respectively, are adapted to store a program comprising a sequence of 44 instructions written in the 22 decimal denominations of the registers I and J respectively.

The remaining registers M, N, R, Z, U, Q, D, E are normally numerical registers, each one adapted to store a number having a maximum length of 22 decimal digits.

Each instruction is made of eight bits B1 to B8 stored in the binary denominations T1 to T8 respectively of a certain decimal denomination: the bits B5 to B8 represent one out of 16 operations F1 to F16 whereas bits B1 to B4 generally represent the address of an operand upon which said operation is to be performed.

Each decimal digit is represented in the computer by means of four bits B5, B6, B7, B8 according to a binary-coded decimal code. In the delay line memory LDR said four bits are recorded in the last occurring four binary denominations T5, T6, T7, T8 respectively of a certain decimal denomination, while the remaining four binary denominations are used to store certain tag bits. More particularly, in this decimal denomination the binary denomination T4 is used for storing a decimal-point bit B4, which is equal to "0" for all the digit of a decimal number except the first entire digit after the decimal point. The binary denomination T3 is used for storing a sign bit B3, which is equal to "0" for all the decimal digits of a positive number and equal to "1" for all the decimal digits of a negative number. The binary denomination T2 is used for storing a digit-identifying bit B2, which is equal to "1" in each decimal denomination occupied by a decimal digit of a number and equal to "0" in each unoccupied decimal denomination (non significant zero).

Therefore the complete representation of a decimal digit in the memory LDR requires the seven binary denominations T2, T3, T4, T5, T6, T7 and T8 of a given decimal denomination.

The remaining binary denomination T1 is used for storing a tag bit B1 whose meaning is not necessarily related to the decimal digit stored in said denomination.

In the following description a bit stored in a binary denomination $a$ of a certain decimal denomination of a register $b$ will be designated as B$ab$, and the signal obtained when reading said bit out of the delay line will be designated LB$ab$.

A bit B1R="1" stored in the first decimal denomination C1 of the register R is used to start the clock pulse generator 44 at the beginning of each memory cycle; a bit B1E="1" stored in the 22$^{nd}$ decimal denomination C22 of the register E is used to stop the generator 44; a bit B1N="1" stored in the $n^{th}$ decimal denomination of the register N indicates that during the execution of a program the next following instruction to be executed is the instruction stored in said $n^{th}$ decimal denomination of the register I or J; a bit B1M="1" stored in the $n^{th}$ decimal denomination of the register M indicates: when introducing a number from the keyboard into the register M, that the decimal digit next introduced is to be stored in the ($n-1^{st}$) decimal denomination; when introducing an instruction from the keyboard, that the next following instruction is to be stored in the $n^{th}$ decimal denomination of the register I or J; when printing a number stored in any register selected among the registers of the delay-line, that the next following digit to be printed is the digit stored in the $n^{th}$ decimal denomination of said register; when adding together two numbers, that the digit of the sum stored in the $n^{th}$ decimal denomination of the register N shall be thereafter corrected by adding a filler digit thereto, as will be seen; a bit B1U="1" stored in the $n^{th}$ decimal denomination of the register U indicates that the execution of a main program routine has been interrupted at the $n^{th}$ instruction of the register I or J for beginning the execution of a subroutine. Therefore the tag bits B1R, B1E are used to represent fixed reference points in the various registers (beginning and end respectively); the tag bits B1N, B1M and B1U represent movable reference points within the registers; moreover the bits B1M are used, when performing an addition, to record, for each decimal denomination, an information pertaining to an operation performed or to be performed upon said denomination.

The regeneration and the modification and shifting of said tag bits B1 are preformed by a tag-bit control circuit 37.

The computer comprises also a binary adder 72 provided with a pair of input lines 1 and 2 for concurrently receiving two bits to be added to simultaneously produce on the output line 3 the sum bit. More particularly, in a first embodiment shown in FIG. 4, the adder comprises a binary addition network 48, adapted to provide on the output lines S and R$b$ the binary sum and the binary carry, respectively, produced by summing up two bits concurrently fed to the input lines 49 and 50 respectively and the previous binary carry bit resulting from the addition of the next preceding pair of bits, said previous binary carry bit being staticized in a carry bit storage A5 made of a bistable circuit. The signals representing the two bits to be added last from the pulse M1 to the pulse M10 of the corresponding bit period, and the signals representing the sum bit S and the carry bit R$b$ are substantially simultaneous thereto. The previous carry bit is stored in the bistable circuit A5 from the pulse M10 of the next preceding bit period until the pulse M10 of the present bit period.

The new carry bit R$b$ is transferred to a bistable circuit A4, in which it is staticized until the pulse M10 causes said new carry bit to be transferred into the bistable circuit A5, where it is staticized during the entire next following bit period so as to feed in proper time the addition network 48 during the addition of the next following pair of bits.

The input line 1 of the adder may be connected to the input line 49 of the addition network 48 either directly via a gate 52 or through an inverter 54 via a gate 53. Therefore it is apparent that in the first case each decimal digit is introduced without modification into the adder, whereas in the second case, as said digit is represented in binary code, the complement of said digit to 15 is introduced in the adder.

The gates 52 and 53 are controlled by a signal SOTT produced by a sign-bit processing circuit which will be described later.

The output line S of the addition network 48 may be connected to the output line 3 of the adder either directly via a gate 55 or via a gate 56 and an inverter 57 acting to complement the decimal digits to 15.

A bistable device 58 is energized through a gate 59 by every bit equal to "1" appearing on the output line S of the addition network 48 during the bit periods T6 and T7, and is deenergized through an inverter 61 and a gate 60 by every bit equal to "0" appearing on said output line S during the bit period T8.

Therefore, upon completion of the addition of a pair of decimal digits during the $n^{th}$ generic digit period, the circumstances that the bistable device 58 remains energized after the last bit period T8 of said digit period indicates that the sum digit is greater than nine and less than sixteen, whereby a decimal carry is to be transmitted to the next following decimal denomination. Through a gate 62 the output signal of the bistable device 58 indicating the presence of said decimal carry is fed into the carry storage A5, which is adapted to enter said decimal carry into the adding network 48 in the next following digit period $C(n+1)$.

A decimal carry toward said next following decimal denomination is to be transmitted also in the case during said bit period T8 of the present digit period C$n$ a binary carry R$b$8 is produced by summing up the two most significant bits B8. Since this binary carry indicates that the sum digit is greater than fifteen. The transmission of the decimal carry is made in this case by the bistable devices A4 and A5 in the manner described above.

Therefore in all cases the circumstance that the bistable device A5 is energized after the last bit period T8 of said digit period C$n$ means that there is a decimal carry to be transmitted from said digit period C$n$ to the next following digit period $C(n+1)$.

Should said digit period C$n$ be the digt period in which the last (most significant) decimal digit among the digits of the two numbers to be added occurs, then through a gate 63 said decimal carry is stored into a bistable device RF. Therefore the bistable device RF when energized indictates that there exists an end carry resulting from the addition of the two most significant decimal digits.

Moreover the computer is provided with a shift register K (FIG. 1$a$) comprising eight binary stages K1 to K8. Upon receiving a shift pulse over a terminal 4, the bits stored in the stages K2 and K8 are shifted into the stages K1 to K7 respectively, while the bits which are then present on the input lines 5, 6, 7, 8, 9, 10, 11, 12, 13 are transferred into the stages K1, K2, K3, K4, K5, K6, K7, K8 and again K8 respectively.

The pulses M4 produced by the pulse distributor 46 (FIG. 1$b$) are used as shift pulses for the register K, which therefore receives one shift pulse during each bit period, that is eight shift pulses during each digit period. The contents of each stage of the register K remains unchanged from the pulse M4 of each bit period until the pulse M4 of the next following bit period. Therefore it is apparent that a bit fed to the input line 13 of the register K during a certain bit period will be available on the output line 14 of the register K after eight bit periods, that is one digit period later, whereby under these conditions the register K acts as a section of delay line having a length corresponding to one digit period.

By connecting whatsoever memory register X and the shift register K in a closed loop while leaving all the remaining registers with their outputs directly connected to their respective inputs to form a closed loop, said register X is effectively lengthened one digit period with respect to said remaining registers. In this lengthened register X, the denomination which is read from the delay line concurrently with the $n^{th}$ decimal denomination of the remaining memory registers, that is during the $n^{th}$ digit period since the reading of the bit B1R which starts the generator 44, is conventionally defined as the $n^{th}$ decimal denomination. Therefore during each memory cycle the contents of the register X will be shifted one decimal denomination, that is delayed one digit period, with respect to the other registers.

Moreover the register K, due to its ability to acts as a delay line, may be used as a counter according to the principles shown at page 198 of the book "Arithmetic Operation in Digital Computers," by R. K. Richards, 1955. More particularly, when its output line 13 and its input line 14 are connected to the output line 3 and to the input line 1 of the adder 72, respectively, while the input line 2 of the adder receives no signal, said counter is adapted to count successive counting pulses which are fed to the carry storing bistable device A5 according to the following criterion. By considering the eight bits contained in the register K as a binary number comprising eight binary denominations, a counting pulse may be fed into the bistable circuit A5 whenever the less significant binary denomination is read out of the register K over the output line 14. Therefore the counting pulses shell be spaced in time one digit period or a multiple thereof.

Figure 1A:
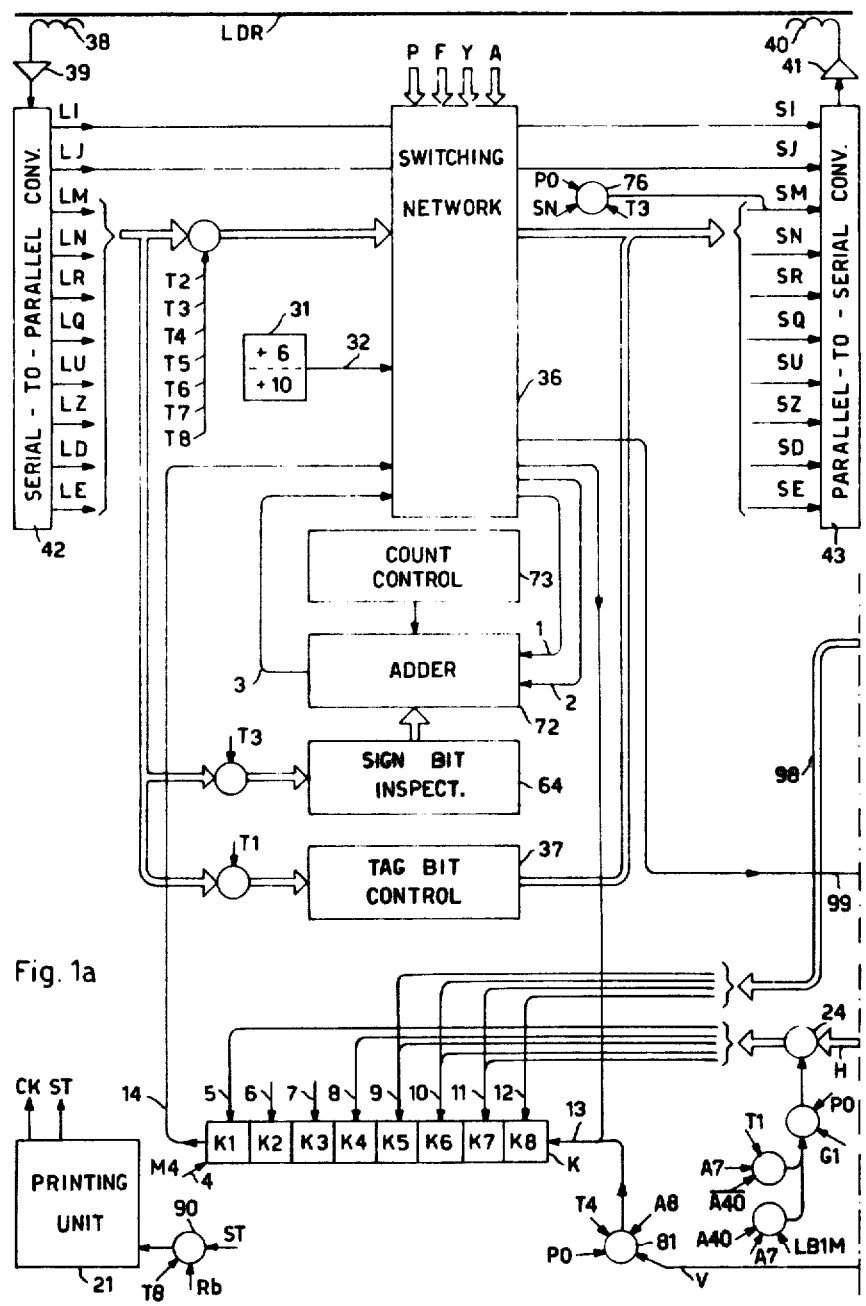

The register K is also adapted to act as a buffer memory for temporarily storing a decimal digit or the address part of an instruction or the function part of an instruction to be printed by a printing unit 21 (FIG. 1a).

The register K is also adapted to act as a parallel-to-serial converter when transferring data or instruction from the keyboard 22 (FIG. 1b) into the delay line memory LDR.

The computer comprises also an instruction staticisor 16 including eight binary stages I1 to I8 for storing the eight bits B1 to B8 of an instruction respecitvely.

The first four stages I1 to I4 containing the address bits B1 to B4 of said instruction feed an address decoder 17 having eight output lines Y1 to Y8, each one corresponding to one of the eight addressable memory registers, and being energized when the combination of said four bits represents the address of said register. The address of the register M is represented by four bits equal to "0," whereby the register M is automatically addressed when no address is explicitly given. The remaining four stages I5 to I8 containing the function bits B5 to B8 of said instruction feed a function decoder 18 having a set of outputs F1 to F16, each output being energized when the combination of said bits B5 to B8 represents a corresponding function.

Moreover the outputs of the stages I1 to I4 and the output lines of the stages I5 to I8 may be connected, via gates 19 and 20 respectively, to the input lines of the stages K5 to K8 of the register K respectively in order to print out the address and the function respectively staticized in said stages.

A switching network 36 (FIG. 1a) is provided for selectively interconnecting according to various patterns hereinafter specified, the ten memory registers, the adder 72, the shift register K and the instruction staticisor 16 in order to properly control the transmission of data and instructions to and from the various parts of the computer. Switching network 36 is made of a diode matrix or transistor NOR-circuit matrix or equivalent switching means having no storage properties.

The selection of the memory registers according to the present address indicated by the decoder 17 is also performed by the switching network 36.

The keyboard 22 for entering the data and the instructions and for controlling the various functions of the computer comprises a numeric keyboard 65 including ten numeral keys 0 to 9 which serve the purpose of entering number into the memory register M via the buffer register K, in a preferred embodiment the register M being the only memory register accessible from the numeral keyboard. Moreover the keyboard 22 comprises an address keyboard 68 provided with keys each one controlling the selection of a corresponding register of the delay line memory LDR.

The keyboard 22 comprises also a function keyboard 69, including keys each one corresponding to the function part of one of the instructions the computer can execute.

The three keyboards 65, 68 and 69 control a mechanical decoder made of code bars cooperating with electrical switches for producing on four lines H1, H2, H3, H4 four binary signals representing either the four bits of a decimal digit set up on the keyboard 65 or the four bits of an address set up on the keyboard 68, or the four bits of a function set up on the keyboard 69, said decoder being also adapted to energize either an output line G1 or G2 or G3 to indicate whether the keyboard 65 or 68 or 69 respectively has been operated.

A decimal point key 67 and a negative algebraic sign key 66, when operated, directly produce a binary signal on the line V and SN respectively.

Some instructions the present computer can execute are listed below, the letter Y designating the selected register corresponding to the address staticized in the staticisor 16:

(F1) Addition: transfer the number stored in the selected register Y into the register M, then add the contents of the register M to the contents of the register N and store the result in the register N, that is symbolically: $Y{-}{-}M$; $(N{+}M){-}{-}N$;

(F2) Subtraction: similarly $Y{-}{-}M$; $(N{-}M){-}{-}N$;

(F3) Multiplication: $Y{-}{-}M$; $(N{\cdot}M){-}{-}N$;

(F4) Division: $Y{-}{-}M$; $(N{:}M){-}{-}N$;

(F5) Transfer from M: transfer the contents of the register M into the selected register, that is $M{-}{-}Y$;

(F6) Transfer into N: transfer into the register N the contents of the selected register, that is $Y{-}{-}N$;

(F7) Exchange: transfer the contents of the selected register into the register N and vice versa, that is $Y{-}{-}N$; $N{-}{-}Y$;

(F8) Print: print-out the contents of the selected register Y;

(F9) Print and zeroizes: print-out the contents of the selected register Y and zeorize same;

(F10) Program stop: stop the automatic execution of the program and wait until operator enters a datum into the keyboard; introduce said datum into the selected register Y (thereafter either automatic program execution or manual operation may be continued);

(F11) Extract from the register I one out of the first eight characters as specified by the address contained in the present instruction, and transfer said character into register M;

(F12) Jump to the program instruction specified in the present instruction, unconditional;

(F13) Jump, conditional.

The computer may be selectively preset to operate according to three modes, namely "manual," "automatic" and "entering program" depending on whether a three-position commutator 23 generates a signal PM, PA or IP respectively. All the aforementioned instructions may be executed in the automatic operation; the first nine instructions may also be executed in the manual operation.

During the program entering operation, the signal IP being present, the address keyboard 68 and the function keyboard 69 are operable to enter the program instructions into the registers I and J via the buffer register K. For this purpose the outputs H1 and H4 of the keyboard decoder may be connected, via gate 24, to the inputs 8 to 11 respectively of the register K. In the meantime, the keyboard 65 is inoperative.

During the automatic operation, in which the program previously entered into the memory LDR is executed, the address keyboard and the function keyboard are inoperative.

The automatic operation comprises a sequence of instruction-extract phases and instruction-execute phases. More particularly during an extract phase an instruction is extracted from the program register I, J and transferred into the staticisor 16; this phase is automatically followed by an execution phase, in which the computer under the control of said staticized instruction executes said instruction; this execution phase is automatically followed by an extraction phase for the next following instruction, which is then extracted and staticized in lieu of the preceding one etc. As long as an instruction is staticized in the staticisor 16, the numeric register indicated by the address part of said instruction remains continuously selected, and the decoder 18 continuously produces the function signal corresponding to the function part of said instruction. During the automatic operation, also the numeric keyboard is normally inoperative, because the computer operates upon the data previously entered into the memory. This keyboard is operated only when the program instruction at present staticized is the stop instruction F10. It is apparent that this instruction allows much more data to be processed than the computer memory may contain.

During the manual operation the numeric keyboard, the address keyboard and the function keyboard may be all operative. More particularly according to this mode of operation the address keyboard and the function keyboard may be caused by the operator to cause the computer to perform a sequence of operations similar to any sequence performed during the automatic operation. For this purpose the operator enters via the keyboard an address and a function, which are therefore staticized via gates 70 and 71 respectively in the staticisor 16 just like during an instruction-extract phase in the automatic operation. Moreover, by entering said instruction (address and function) into the keyboard, an instruction-execution phase is automatically instituted for executing said entered instruction in a manner similar to the execution phase in the automatic operation. Upon completion of said instruction-execution phase the computer stops and waits for a new instruction entered by the operator through the keyboard.

As previously mentioned, when no address key is operated, the register M, which is specialized to receive the data from the keyboard, is automatically addressed. Therefore, when entering via the keyboard one of the instructions F1, F2, F3, F4 corresponding to the four fundamental arithmetic operations, the operator may select not to operate the address keyboard but instead to enter a number through the numeric keyboard; in this case said operation will be performed upon said entered number. Therefore during the manual operation any arithmetic operation corresponding to the key depressed in the function keyboard 69 may be performed either upon a number previously entered into the register M via the numeric keyboard 65 or upon a number stored in a memory register selected by means of the address keyboard.

Moreover it has been seen that during the automatic operation the functions specified in the instructions are executed upon the data previously entered in the memory. Before pushing the button AUT to start the automatic program execution, the operator after having set the computer to operate in the manual mode, may enter each one of said initial data, by first entering said datum through the numeric keyboard into the register M, then depressing the address key corresponding to the register in which said datum is to be stored, and then depressing the function key corresponding to the transfer instruction F5.

Figure 6:
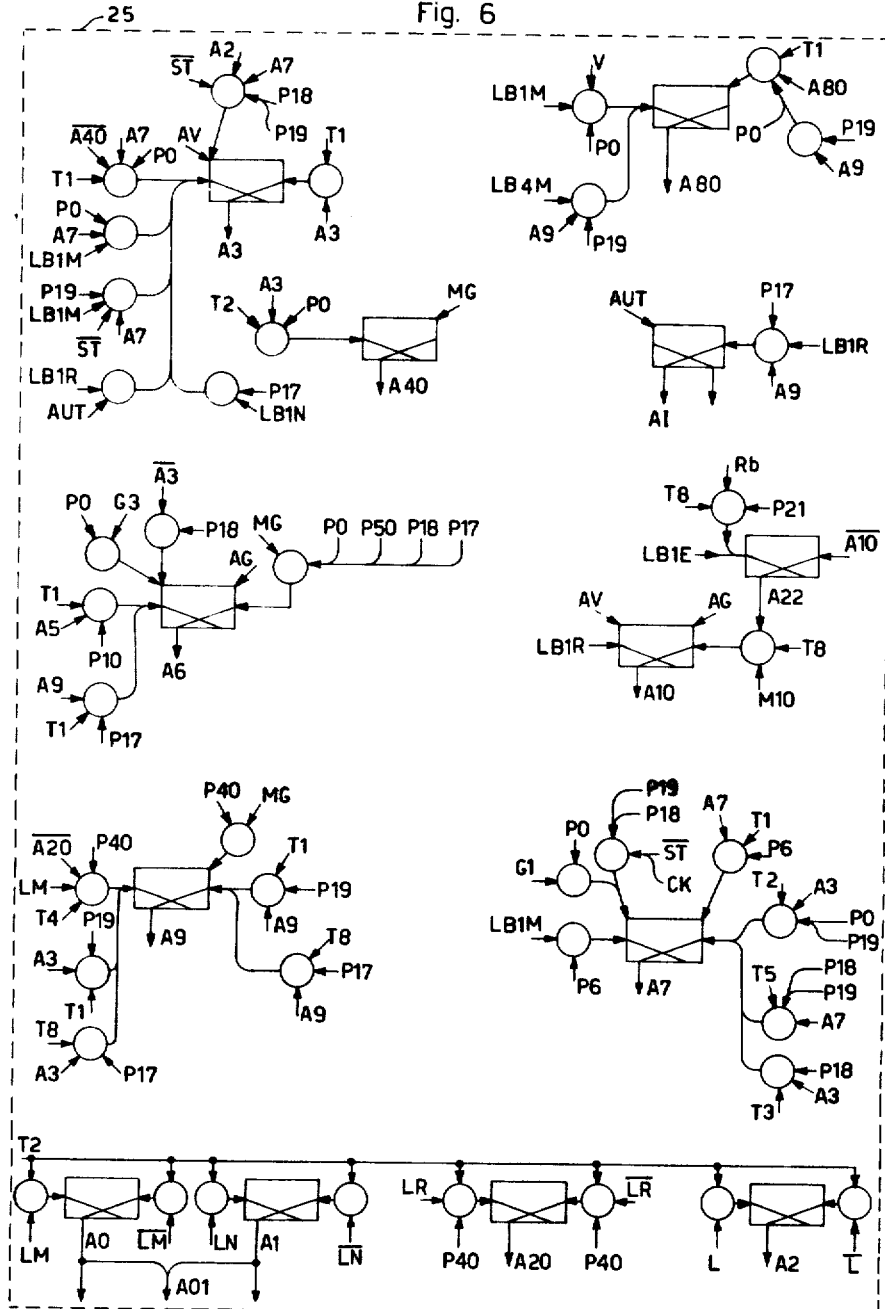
FIG. 6 shows a group of bistable devices of the computer according to FIGS. 1a and 1b.

The computer comprises also a group of bistable devices collectively represented by a box 25 in FIG. 1b and in more details in FIG. 6. These bistable devices are used, inter alia, to staticize some internal conditions of the computer, the output signals of said bistable devices representing said conditions being collectively designated by the reference letter A in the block diagram of FIG. 1.

More particularly, the bistable device A0 is energized during each memory cycle upon reading in the register M the first binary denomination T2 storing a digit indicating bit B2 equal to "1" and is thereafter deenergized upon reading the first binary denomination T2 storing a digit indicating bit B2 equal to "0," whereby the bistable device A0 remains energized during the entire time interval spent in reading out the number stored in the register M. Otherwise stated, the bistable device A0 indicates within each memory cycle the length and the position of the number stored in the register M. It is to be pointed out that according to a feature of the present invention said length and said position are completely variable.

The bistable devices A1 and A2 are adapted to give a similar indication as to the length and position of the number stored in the register N and Y respectively, Y designating the register at present addressed and selected. For this purpose the bistable devices A1 and A2 are controlled by the output LN of the register N and by the output L of the selected register Y respectively. The outputs of the bistable devices A0 and A1 are combined to produce a signal A01 which lasts, during each memory cycle, from the reading time of the first decimal digit among the decimal digits of the numbers M and N until the reading time of the last occurring decimal digit among said decimal digits.

The bistable device A3 is normally used to distinctively indicate a certain digit period during which a certain operation is to be performed, said indication being obtained in that it remains energized during said digit period and deenergized during the other digit periods.

The bistable device A7 is normally used to distinctively indicate a certain memory cycle or a part thereof during the operation of the input and output units of the computer.

The bistable devices A6, A8, A9 are used to indicate the occurrence of certain conditions during the execution of certain instructions.

The function of other bistable devices of the group 25 will be described later.

The computer is also provided with a sequence control unit 26 comprising a group of status-indicating bistable devices P1 to P$n$, which are energized one at a time, whereby at any time the computer is in a certain status corresponding to one of the bistable devices P1 to P$n$ at present energized. In its operation the computer goes through a sequence of statuses, and accomplishes certain elemental operations during each status. The sequence of said statuses is determined according to a criterion established by a logical network 27. More particularly on the basis of the present status of the computer indicated by the bistable devices P1 to P$n$ via the line P, of the instruction at present staticized in the staticisor 16 and indicated by the decoder 18 via the line F, and of the present internal conditions of the computer indicated by the group of condition-staticizing bistable devices 25 via the line A, said network 27 decides what status must follow and gives an indication of said decision by energizing the output 28 which corresponds to said status. Thereafter a timing network 29 produces a change-of-status timing pulse MG, whereby one of the bistable devices P1 to P$n$ corresponding to said next following status is energized via the gate 30 corresponding to said output 28, while all the remaining status-indicating bistable devices of the group P1 to P$n$ are deenergized.

Entering a number into the memory via the keyboard

The status P21 is followed by the status P0 wherein the data may be entered into the memory via the keyboard.

In the status P0 the switching network 36 permanently connects the memory register M and the shift register K to build up a closed loop, whereby the register M is lengthened one digit period. In the meantime all the remaining registers have their output directly connected to their respective input so as to build up a closed loop, whereby their contents is continuously regenerated so as to rematin unchanged during the following memory cycles. Also the tag bits B1 of said remaining registers are continuously regenerated through the control circuit 37, whereby the entire contents of all the registers but the register M remains unchanged during said status P0.

The timing signal MG which causes the computer to switch from the status 21 to the status P0 resets the bistable device A40. The operator pushes either the minus sign key 66 or no key depending on whether the number to be entered is negative or positive. In the first case the signal SN produced by the pushed key causes a negative sign bit B3="1" to be written via a gate 76 in the third binary denomination of all the decimal denominations of the register M. Thereafter the operator pushes the numeric key corresponding to the first decimal digit to be entered. Therefore the electrical contacts associated with the keyboard 22 produce the four binary signals H1, H2, H3, H4 representing said decimal digit and a signal G1 indicating that said four signals pertain to a numeric character entered via the numeric keyboard 65. The duration of all said signal produced by the keyboard is more than one memory cycle.

The beginning (leading edge) of said signal G1 energizes the bistable device A7. At a certain instant which may occur either before or after said leading edge, the resynchronizing bit B1R circulating in the delay line starts the generator 44. During the first clock pulse T1 produced by the generator 44 after the energization of the bistable device A7, the pulse M4 by opening the gate 24 causes the bits H1, H2, H3, H4 and G1, to be transferred from the keyboard 22 into the stages K4, K5, K6, K7 and K1 of the register K respectively. Since the depressing of the key in the keyboard 22 is not synchronized with the generator 44, said first clock pulse T1 may coincide with the first bit period of whatsoever digit period $C(n+1)$ among the twenty-two digit periods of the present memory cycle. Therefore at the beginning of said clock pulse T1 the stages K1 to K8 of the register K will contain the binary denominations B1 to B8 respectively of the $n^{th}$ decimal denomination of the register M. At the pulse M4 of said bit period T1 the bits of the binary denominations B2 to B8 of said $n^{th}$ decimal denomination and the bit of the first binary denomination B1 of the next following decimal denomination $C(n+1)$ will be transferred into the stages K1 to K8 of the register K respectively. At the same pulse M4 the bits H1, H2, H3, H4 and G1 are entered from the keyboard 22 into the register K. Therefore these bits are written into the binary denominations B5, B6, B7, B8 and B2 respectively of said $n^{th}$ decimal denomination Cn of the register M, the four first-mentioned bits representing the entered digit and the fifth bit being a digit-indicating bit. As previously explained, the binary denomination B3 has already been occupied by a sign bit.

Therefore it is apparent that the first digit entered via the keyboard is written at random in a certain $n^{th}$ decimal denomination, which is the first decimal denomination first reaching the reading and writing transducers 38 and 40 after operation of the corresponding key.

Moreover at said pulse M4 of said first bit period T1 of the digit period $C(n+1)$ the output SM of the tag-bit controlling circuit 37 is energized because the output of the gate 78 is energized. Therefore a tag bit B1M="1" is written in the first binary denomination of said $n^{th}$ decimal denomination of the register M, just ahead of the digit being introduced from the keyboard. Moreover said clock pulse T1 energizes the bistable device A3, which is thereafter deenergized by the next following pulse T1, thus remaining energized only during said (n+1st) digit period in order to designate the digit period during which the digit set up on the keyboard is entered in the register M.

The clock pulse T2 of said digit period $C(n+1)$ deenergizes the bistable device A7, to inhibit said digit from being entered once more in the register M in the next following cycle, whereby said digit is entered only once in the register M, despite the fact that the corresponding key is held depressed during more than one memory cycle. It is thus apparent that the function of the bistable device A7 in this case is to distinguish the first memory cycle from the following memory cycles when entering a digit via the keyboard. Moreover the same clock pulse T2 energizes the bistable device A40, which will thus remain energized also during the setting up of the following digits on the keyboard in order to distinguish the first set up digit from the following ones. This is because the first entered digit is written at random in a decimal denomination of the register M, whereas the following digits must be written in the successive decimal denominations of the register M according to an ordered sequence. The purpose of the bistable device A40 is to determine this difference in the digit entering operation. Said first entered digit circulates during the following memory cycles in the register M and in the register K which are connected into a closed loop as previously explained. In the tag-bit controlling circuit 37 also the tag bits B1M are caused to be stepped through the shift register K because they are transferred from the output LM of the register M to the input 13 of the register K since gate 79 instead of gate 80 is opened, whereby said bit B1M="1" remains recorded in the $n^{th}$ decimal denomination occupied by said first entered digit, while the tag bit recorded in the first binary denomination of the remaining decimal denominations of the register M continues to be B1M="0."

Thereafter the second decimal digit of the number to be entered is set up on the keyboard, which therefore produces the binary signals H1, H2, H3, H4 representing said digit and the signal G1. As previously stated, these signals have a duration corresponding to more than one memory cycle.

As in the case of the first entered digit, the beginning of the signal G1 energizes the bistable device A7. Upon reading the tag bit B1M="1" recorded in the $n^{th}$ decimal denomination of the register M, that is the denomination occupied by the first entered digit, the bistable device A3 is energized. The bistable device A3 will be thereafter denergized by the next following clock pulse T1, whereby it remains energized only during the $n^{th}$ digit period, which begins when said tag bit B1M="1" is read from the delay line LDR. It is to be pointed out that when reading said bit B1M="1" located at the beginning of the $n^{th}$ decimal denomination of the register M, the $(n-1^{st})$ decimal denomination is in the register K, while the $(n-2^{nd})$ decimal denomination, having just been rewritten in the register M, is at the beginning of the delay line.

When reading said tag bit B1M, the pulse M4 by opening the gate 24 causes the binary signals H1, H2, H3, H4 and G1 to be transferred from the numeric keyboard 65 into the stages K4, K5, K6, K7 and K1 of the register K respectively.

Moreover in the tag-bit controlling circuit 37 said bit B1M="1" read out of the $n^{th}$ decimal denomination of the register M is directly transferred on the output SM via the gate 30 opened by the bistable device A3 instead of being stepped through the register K.

Therefore it is apparent that the tag bit B1M="1" is recorded in the $(n-1^{st})$ decimal denomination and that the second digit set up on the keyboard is also written in said $(n-1^{st})$ denomination that is the denomination which precedes the denomination where the first digit has been entered.

It is thus clear that the tag bit B1M="1" is shifted from the $n^{th}$ decimal denomination to the $(n-1^{st})$ denomination so as to be relocated any time at the beginning of the last entered digit.

The bistable device A7 is deenergized by the first timing pulse T2 occurring after the reading of said tag bit B1M. Therefore during the following memory cycles the repetition of the transfer process from the keyboard to the register K for the digit set up on the keyboard is avoided and the first and second digits, included the tag bit B1M="1" which at present is associated with said second digit, circulate in the closed loop formed by the registers K and M.

In a similar manner the following digits of the number are set up on the keyboard and entered into register M. In general, any new entered digit is written in the decimal denomination preceding the denomination of the last entered digit, on account of the fact that the digits are entered beginning from the most significant one and read out of the delay line and processed beginning from the least significant one.

Moreover, any time a new digit is entered via the keyboard, the tag bit B1M="1" is shifted from the last entered digit to said new entered digit to allow the decimal denomination containing the last entered digit to be subsequently recognized.

It is thus apparent that any digit counter is dispensed with in this phase of the computer operation, due to the use of the shiftable tag bits.

It is also apparent that, contrary to the known computers, the operator may set up on the keyboard any number without any care as to its alignment.

For entering the decimal point the operator pushes the key 67 after having entered the units integer digit, whereby a signal V having a duration of a few memory cycles is produced. As the digit indicating signal G1 is absent, the bistable device A7, and thus also the bistable device A3, is not energized, whereby the gate 24 connecting the keyboard to the register K remains closed, and the mechanism for shifting the tag bit B1M="1" to the next following decimal digit is inoperative.

As the bit B1M="1" associated with said units integer digit, which is now the last entered digit, is read out of the memory LDR, a bistable device A80 is energized. The bistable device A80 is thereafter deenergized by the next following clock pulse T1, whereby, assuming this digit has been entered in a certain decimal denomination Cm of the register M, said bistable device will remain energized during the entire digit period Cm. Therefore during the fourth bit period T4 of said digit period Cm a decimal-point indicating bit B4="1" is entered in the stage K8 of the register K via a gate 81. Said decimal-point indicating bit is thus written in the binary denomination T4 of the decimal denomination occupied by said units digit.

It has been thus explained how a number is entered from the keyboard 65 to the register M of the memory LDR.

In this status P0, should the operator set up an address on the keyboard 68 instead of a number on the keyboard 65, whereby the signal G2 instead of G1 is produced, the four bits H1, H2, H3, H4 representing in this case said address would be transferred via the gate 70 into the stages I1, I2, I3, I4 of the instruction staticisor 16 respectively. Thus the computer receives through the decoder 17 the address Y1 to Y8 of the selected register.

In the manual mode of operation, in the status P0 the entering of a number and the selection of a register are always followed by the entering of a function via the function keyboard 69. The actuation of the keyboard 69 generates a signal G3, whereby the four bits H1, H2, H3, H4 which in the present case represent the function set-up on the keyboard, are transferred via a gate 71 into the stages I5, I6, I7, I8 of the staticisor 16 respectively, so as to indicate to the computer, through the decoder 18, the function F1 to F16 set up on the keyboard. Moreover, whatever said function may be, the beginning of the signal G3 energizes a bistable device A6, whereby in the change-of-status timing circuit 29 the leading edge of the signal A10, produced at the beginning of the next following memory cycle when the generator 44 starts, generates via a gate 83 a timing signal MG which causes the computer to switch to the next following status, said next following status being determined according to the particular instruction at present set up on the keyboard and staticized in the staticisor 16. The same signal MG deenergizes the bistable device A6, which is therefore effective to prevent the circuit 29 from unduly producing other change-of-status timing signals MG in the following memory cycles occurring during the signal G3. In said next following status, the computer will execute the instruction set up on the keyboard.

Addition and subtraction

The addition and the subtraction of two numbers stored in the registers M and N respectively are accomplished according to the following rules. A true addition is performed when either the signs of the numbers M and N are equal (bistable device A8 is energized) and the instruction at present staticized in F1 (addition) or the signs of the numbers N and M are different (bistable device A8 is deenergized) and the instruction at present staticized is F2 (subtraction). In the other cases a subtraction is effectively performed.

To perform an addition, during a first memory cycle, in which the computer is in the status P5, the two numbers N and M are added together digit by digit, a decimal carry being transmitted to the next higher decimal denomination if the sum digit either is greater than 15 or lies between 10 and 15, the first circumstance being indicated by the presence of a final binary carry R8 produced by summing up the most significant bits B8 and the second circumstance being indicated by the energization of the bistable device 58. For this purpose the output of the bistable device 58 during the execution of an addition is connected to the summing network 48 via a gate 62. The result obtained by adding together the two numbers in the above manner is not correct, in that some digits of the result may be greater than nine and therefore have no meaning in the binary-coded decimal code, whereby a radix correction from the binary code to the binary-decimal code is to be performed. To this end during the single memory cycle in which the computer is in the status P5 allotted to the computation of the uncorrected sum a tag bit B1M is recorded in each decimal denomination to indicate the nature of the radix correction to be performed upon the corresponding sum digit, during a following memory cycle (in which the computer is in the status P6) said sum being corrected digit by digit according to the indications given by said tag bits.

More particularly, in the case of the addition, during the second memory cycle, in which the computer is in the status P6, each digit of the sum is corrected from the binary code to the binary-decimal code by adding the filler digit +6 to each digit of the result which in the first memory cycle (while computing the uncorrected sum) had produced a decimal carry.

Therefore the addition is accomplished within two memory cycles, in which the computer is in the status P5 and P6 respectively.

In order to execute the subtraction, during a first memory cycle, in which the computer is in the status P5, the numbers M and N are added together, after having complemented to 15 each decimal digit of the number N. During this cycle a decimal carry is transmitted from a denomination to the next higher denomination only if the sum digit for the first mentioned denomination is greater than 15 (this circumstance is indicated by the presence of a final binary carry R8 from the highest binary denomination T8 of said denomination), no decimal carry being transmitted if said sum digit lies between 10 and 15. For this purpose the gate 62 is held closed for preventing the output of the carry indicating bistable device 58 from being connected to the summing network 48. The absence of an end decimal carry RF resulting from the addition of the two most significant decimal digits of the numbers M and N respectively indicates in this status P5 that the number M is less than the number N, where as the presence of said final carry RF indicates that the number N is less than the number M.

In the first case, during a following memory cycle (in which the computer is in the status P6) the radix correction is performed by adding either the filler digit +6 or +0 to each digit of the uncorrected sum depending on whether in the status P5 when adding the pair of most significant bits B8 of the corresponding decimal denomination a binary carry R8 had been produced or not. Moreover in the status P6 each digit of the sum, while being corrected, is also complemented to 15 again, whereby the subtract operation is completed within two memory cycles. If, on the contrary, the number N is less than the number M (this circumstance is indicated by the presence of said end carry RF in the status P5) in the status P6 the filler digits to be added to each digit of the uncorrected result are +0 and +10 respectively for the two cases previously considered; moreover in the status P6 the result is not recomplemented, but instead during a new memory cycle (in which the computer is in the status P7) the number +1 is added to the corrected result, thus obtaining a new result which is in turn corrected from the binary to the binary-decimal code during a following memory cycle (in which the computer is in the status P8). Therefore in this case the operation is completed in four memory cycles (corresponding to the four statuses P5, P6, P7 and P8 respectively).

The operation of the computer during the addition and the subtraction will now be described in more detail.

After having aligned the two numbers M and N with respect to their decimal point in the statuses P3 and P14 respectively, and after having examined the signs of the two addends in the status P9, the computer switches to the status P5. During this status the bistable device A8 continues to give an indication as to the agreement of the signs of the two addends as determined in the status P9, whereby in the status P5 the circuit 64 (FIG. 4) produces a signal SOTT if either there is a sign disagreement and the instruction at present staticized is F1 (addition) or there is a sign agreement and the instruction at present staticized is F2 (subtraction), whereas in any other case the circuit 64 produces a signal ADD.

In the status P5 the switching network 36 permanently connects the outputs LN and LM of the registers N and M to the two inputs 1 and 2 of the adder 72 respectively, the output 3 of the adder to the input 13 of the register K and the output 14 of the register K to the input SN of the register N. Moreover the output of all the memory registers, except the register N, is corrected to the respective input. Therefore in this status, which lasts a single memory cycle, the contents of the register M, without being destroyed, is added to the contents of the register N, the latter contents having been either complemented to 15 digit by digit via the complementer 54 or not depending on whether the signal SOTT or ADD is present, the result being written in the register N via gate 55, while the contents of all the other registers is regenerated so as to remain unchanged.

More exactly, the connection between the inputs 1 and 2 of the adder and the outputs LM and LN of the registers M and N exists only during the bit periods T5, T6, T7 and T8 of each digit period.

During the remaining bit periods T1, T2, T3 and T4 the switching network 36 directly connects the output of the register N to the input of the register K, so as to bypass the adder 72, whereby the bits B1, B2, B3, B4 of each decimal denomination, which are tag bits to be held unmodified in this phase, are regenerated.

On the contrary during the bit periods T5, T6, T7, T8 of the generic $n^{th}$ decimal denomination the bits B5, B6, B7, B8 respectively of the corresponding decimal digit of the number M are added to the bits B5, B6, B7, B8 respectively of the corresponding decimal digit of the number N (the four last mentioned bits being inverted by the inverter 53 if the signal SOTT is present), each pair of corresponding bits being fed to the adder along with the binary carry produced by adding the next preceding pair of bits and staticized in the bistable device A5, whereby the added 72 produces in each digit period during the bit periods T5, T6, T7 and T8 respectively, four bits representing a decimal digit of the uncorrected sum. Due to the previous explained connection of the register, said uncorrected sum digit, assuming it has been produced by adding two addend digits stored in the $n^{th}$ decimal denomination of the registers M and N respectively, is recorded in the $(n-1^{st})$ decimal denomination of the register N.

During said generic $n^{th}$ digit period, and more exactly at the end of the last bit period T8 thereof, the binary-carry staticizing bistable device A5 is as usually energized or not depending on whether the sum of the last pair of bits B8 has generated a final binary carry R8 or not. The bistable device A5 thereafter remains as usually in the energized state until it receives from the bistable device A4 the new binary carry produced by summing up the next following pair of bits, which in this case are the first bits B5 of the next following digit period $C(n+1)$. Therefore it is apparent that the bistable device A5 is adapted to feed said final binary carry R8 of the $n^{th}$ decimal denomination to the adder 72 when the adder receives the first pair of bits B5 of the $(n+1^{st})$ decimal denomination. As said final binary carry indicates also the presence of a decimal carry, it is clear that said bistable device A5 is also adapted to transmit the decimal carry between said two decimal denominations. This happens both in the case of addition (signal ADD is present) and in the case of subtraction (signal SOTT is present). Moreover in the case of addition, but not in the case of subtraction, gate 62 is opened during the bit period T1 immediately following said bit period T8 for connecting the bistable device 58 to the bistable device A5, whereby in the case of addition when the adder receives the first pair of bits B5 of the $(n+1^{st})$ decimal denomination the bistable device A5 feeds a decimal carry to the adder not only if the sum digit in the $n^{th}$ denomination was greater than fifteen but also if said sum digit was between ten and fifteen.

Therefore, in every case, in the status P5 the fact that the bistable device A5 is energized during the bit period T1 of the $(n+1^{st})$ digit period indicated that a carry has been transmitted from the $n^{th}$ to the $(n+1^{st})$ decimal denomination. In said bit period T1 the tag bit controlling circuit 37 causes a tag bit B1M="1" to be written into the $(n+1^{st})$ decimal denomination of the register M via a gate 85 if said decimal carry has been produced in the $n^{th}$ decimal denomination. The same happens for each one of the successive digits to be added. It is to be noted that said tag bit is effectively written via gate 85 in the proper denomination because writing in the register N is now effectively delayed one digit period with respect to writing in the register M due to the fact that in the present status the contents of the register N recirculates through the register N and the shift register K while the contents of the register M recirculates only through the register M itself.

Furthermore, it is to be noted that, due to the aforesaid connection of the registers N, K and M (register M has its input directly connected to its output, while register N has its input and its output connected to the output and to the input respectively of the register K, which is long one digit period) at the end of the status P5, which lasts a single memory cycle, the uncorrected result of the addition, stored in the register N, will appear as delayed one digit period with respect to the contents of the register N.

Only in the case of subtraction (signal SOTT is present) in the first bit period T1 following the digit period in which the last (most significant) pair of decimal digits of the numbers M and N has been added, the decimal carry signal, if any, produced by adding said last pair of decimal digits is sent via gate 63 to energize the bistable device RF. The bistable device RF will thereafter indicate during the following memory cycles the existence of said end carry, whereby the circumstance that said bistable device RF is either energized or not will indicate whether the number N was less than the number M or not.

It is to be noted that gate 63 may be opened only after disappearance of the signals A1 and A0 indicating the length and position of the number N and M, whereby the bistable device is responsive only to the end carry produced by adding the last pair of digits.

Upon completion of this summation cycle, the leading edge of the signal A01 produces via gate 87 in the circuit 29 a change-of-status timing pulse MG which causes the computer to switch to the next following status. This status, as determined by the logic network 27, is the status P6, which lasts a single memory cycle and is spent for the correction of the sum.

The status P5 is always followed by the status P6, whatever the internal conditions of the computer may be.

In the status P6 the switching network 36 connects the register M and the register K so as to build up a closed loop, whereby the contents of the register M is delayed one decimal denomination with respect to the register N. Since in the preceding status P5 the contents of the register N had been delayed the same amount with respect to the register M, the two numbers M and N are thus restored into their previous alignment with respect to the decimal point. Moreover the switching network 36 connects the inputs 1 and 2 of the adder to the output LN of the register N and to the output 32 of a filler digit generator 31, and the output 3 of the adder to the input SN of the register N. As previously explained, due to the relative displacement of the numbers stored in the registers M and N, in this status P6, when beginning to read out of the delay line the $n^{th}$ decimal denomination of the register N, the tag bit B1M is read out of the delay line, this tag bit indicating what kind of radix correction is to be performed upon said $n^{th}$ digit of the uncorrected sum stored in the register N. More particularly the reading signal LB1M produced by reading said tag bit from the memory LDR either energizes the bistable device A7 or not depending on whether its value is "1" or "0," said bistable device A7 being thereafter deenergized at the beginning of the next following clock pulse T1, whereby during the entire $n^{th}$ digit period the bistable device A7 indicates what kind of correction is to be performed upon the uncorrected sum digit stored in said $n^{th}$ denomination of the register N.

More particularly, if an addition is being performed (signal ADD is present), the bistable device RF is surely deenergized, because, as previously stated, the existance of an end carry RF produced during the status P5 by adding together the most significant pair of digits has no relevance in the case of addition.

In the case of addition, in the status P6 the output S of the addition network 48 is connected to the output 3 of the adder 72 via gate 55, whereby the corrected sum produced in said status P6 is not recomplemented. Moreover, while feeding the input 49 of the addition network 48 with the digit of the $n^{th}$ decimal denomination of the register N (uncorrected sum) via gate 52, the filler digit generator 31 simultaneously feeds the input 2 with the filler digit 6, whose code representation B5=0, B6=1, B7=1, B8=0 is produced via gate 33 provided the bistable device A7 is simultaneously in the energized state; if on the contrary the bistable device A7 is deenergized, generator 31 feeds the input 2 with the decimal digit 0, which is represented by four binary zeroes.

In the case of subtraction (signal SOTT is present) and if in the preceding status P5 no end decimal carry RF has been produced, whereby the bistable device RF also in this case is deenergized, in the status P6 the output S of the addition network 48 is connected to the output 3 of the adder 72 via gate 56 and inverter 57, whereby each bit B5, B6, B7, B8 of the corrected sum is inverted (and so the decimal digit represented by said four bits is recomplemented to 15) before being rewritten into the register N. The radix correction of the sum is accomplished by adding to each digit of the uncorrected sum either the filler digit 6 via gate 33 of the filler digit generator 31 or 0 as in the previous case.

If, on the contrary, in the case of subtraction, the signal RF is present to indicate that in the preceding status P5 an end decimal carry had been produced, the corrected sum produced by the adder 72 in the status P6 is written into the register N via gate 55 without complementing. Moreover in this case while feeding the addition network 48 via gate 52 with the bits B5, B6, B7, B8 of the uncorrected sum digit contained in the generic $n^{th}$ digit period of the register N, the filler digit generator 31 simultaneously produces via gate 34 the bits B5=0, B6=1, B7=0, B8=1 representing the decimal number 10 if the bistable device A7 is in the deenergized state during said digit period; if on the contrary the bistable device A7 is energized, the decimal digit 0, represented by four binary zeroes, is fed.

In all the three aforesaid cases (addition, subtraction with M less than N, subtraction with N less than M), during the status P6 the leading edge of the signal A01 produces, via the gate 87 of the circuit 29, a change-of-status timing pulse MG which causes the computer to switch to the next following status.

So in the first two cases the addition, respectively the subtraction, is completed, whereby the logic network 27 designates as the next following status either the status P17 (extract the next following instruction) if the computer is preset for the automatic mode of operation and the instruction F1 (addition) of F2 (subtraction) is at present staticized, or the status P18 (begin to print out the first addend) if the computer is preset for the manual mode of operation and the instruction F1 (addition) or F2 (subtraction) is at present staticized.

On the contrary, in the third case, in which the bistable device RF remains energized, the status P6 is followed by the status P7, in which the number +1 is added to the result stored in the register N and by a status P8 in which the digits of the new result thus obtained are corrected from the binary code to the binary decimal-code, the operation of the computer in said statuses P7 and P8 being similar to the operation in the statuses P5 and P6 respectively. In the status P8 the leading edge of the signal A01 indicating that there are no more digits to be added, causes the computer to switch (see FIG. 7) to the next following status, which is either the status P17 or the status P18 or another status as previously explained.

As to the sign of the result, in the status P6 the sign bits recorded in the register N are regenerated without modification if in the status P5 no end decimal carry RF has been produced, whereas they are inverted by obvious means not shown in the drawings before being rewritten into the delay line LDR if the final carry RF is present.

According to a second embodiment of the computer according to the invention, not shown in the drawings, the addition an the subtraction are performed according to the following rules.

In a first memory cycle (in which the machine is in the status P40) the number M is added to the number N after having complemented each digit of the number N to 15, for the only purpose of determining, on the basis of the existance of an end decimal carry RF, whether N is greater than M or not.

The operation of the computer in this status P40 is quite similar to the operation in the status P5 according to the first embodiment when the signal SOTT was present, apart that now the register N is not connected to the register K but has its output connected to its input via the adder 72.

During a second memory cycle (in which the computer is in the status P50) the number M is added to the number N, the several digits of the greater one of the two numbers M and N being either complemented to 15 or not depending on whether a subtraction or an addition is being performed. For this purpose the switching network 36 connects either the output LN of the register N and the output LM of the register M to the inputs 1 and 2 respectively of the adder 72 or vice versa depending on whether said signal RF is present or not, the input 1 being anyway connected to the input 49 via the complementer 54. In a third memory cycle (in which the computer is in the status P60) the correction from the binary code to the binary-decimal code is performed by adding the filler digit +6 to each uncorrected sum digit which has produced a final binary carry R8 and the filler digit +0 to each other uncorrected sum digit. Moreover the digits of the result are recomplemented to 15 if a subtraction is being performed.

The modifications to be made in the adder shown in FIG. 4 to make it capable of operating according to the preceding rules are obvious to those skilled in the art.

From the foregoing it is apparent that whenever the instruction staticisor 16 staticizes the instruction Y, F1 (addition) or Y, F2 (subtraction), the computer is adapted under the control of the sequencing circuit 26 to automatically go through a sequence of statuses which, according to the second embodiment of the adding device of the computer, is as schematically shown in FIG. 8a.

More particularly, starting either from the status P0 in which said instruction is set up on the keyboard in the manual operation or from the status P17 in which said instruction is extracted from the memory LDR in the automatic operation, the addition (or subtraction) sequence comprises:

status P2, wherein the contents of the register Y addressed by said instruction is transferred into the register M;

statuses P3 and P14, wherein the numbers stored in the registers M and N respectively are aligned so as to have their decimal point located in the first decimal denomination C1;

status P9, wherein the two numbers M and N are examined to determine whether their algebric signs are in agreement;

status P40, wherein the two numbers M and N are examined to determine whether number M is greater than number N or not;

status P50, wherein the two numbers M and N are added together;

status P60, wherein the radix correction for the sum so obtained is performed.

After this sequence, the computer, if preset for the automatic mode of operation, automatically reverts to the status P17, wherein the next following instruction is extracted; if preset, on the contrary, for the manual mode of operation, it goes through the sequence of statuses P18, P19, P22 during which the number Y is printed out and thereafter it reverts to the status P0 wherein the next following instruction is set up on the keyboard.

MULTIPLICATION AND DIVISION

If the instruction at present staticized in the staticisor 16 is Y, F3 (multiplication) the sequence of statuses the computer goes through, starting either from the status P0 (if in manual operation) or from the status P17 (if in manual operation) or from the status P17 (if in automation operation) is as follows (FIG. 8b):

status P2 (lasting one memory cycle) wherein the number stored in the register Y (multiplicand) addressed by said instruction is transferred into the register M;

status P3, wherein the number stored in the register M (multiplicand) is repeatedly shifted until its first (least significant) integer digit containing the decimal point bit B4="1", reaches the first decimal denomination C1 of the register M;

status P14, wherein the number stored in the register N (multiplier) is repeatedly shifted (one digit period for each memory cycle) until its most significant digit reaches the first decimal denomination C1 of the register N;

status P9 (lasting one memory cycle) wherein the two numbers to be multiplied are examined as to sign agreement, while the contents of the register N (multiplier) is transferred into the register R for allowing the register N to subsequently accumulate the product;

status P40 (lasting one memory cycle) wherein the two operands are examined to determine which is the greatest one (this has no relevance when multiplying, but rather only when dividing);

status P10 (lasting one memory cycle) wherein the digit of the multiplier which is stored in the decimal denomination occupied by the decimal point of the multiplicand is diminished one unit, while the multiplier itself is delayed (that is shifted toward the most significant denomination one digit period;

status P50 (lasting one memory cycle), wherein the multiplicand M is added to the number stored in the accumulator N;

status P60 (lasting one memory cycle), wherein the radix correction of the sum obtained in the preceding status is performed.

From this status P60 the machine reverts into the status P40 for repeating the partial sequence P40, P10, P50, P60, which partial sequence is repeated $n$ times if $n$ is the most significant decimal digit of the multiplier. It is to be noted that the numbers stored in the registers R, N and M are delayed one digit period, that is shifted one decimal denomination toward the most significant denomination, in the statuses, P10, P50, and P60 respectively whereby after each one of said partial sequences P40, P10, P50, P60 said three numbers are restored into their previous alignment. After the $n^{th}$ of said partial sequences, in order to shift the multiplier (register R) and the partial product (register N) one decimal denomination toward the most significant denominations, a reduced partial sequence comprising the statuses P40, P10, P50 is executed. In the status P50 of this reduced partial sequence, contrary to the normal operation of the computer in the status P50, the switching network 36 does not connect the register M to the adder 72, whereby the number N is shifted without being altered.

Thereafter $m$ partial sequences P40, P10, P50, P60 are executed as previously explained, if $m$ is the second most significant digit of the multiplier, and so on.

By examining in more details the operation of the computer, it is to be noted that in the status P9 the multiplier is transferred from the register N to the register R via a binary inverter, whereby each decimal digit of the multiplier itself is complemented to 15.

In the status P10 the switching network 36 connects the output LR of the register R to the input 1 of the adder 72, whose output is connected to the input 13 of the register K, whose output 14 in turn is connected to the input SR of the register R so as to build up a closed loop. As the second input 2 of the adder 72 receives no signal, the contents of the register R recirculates in said loop without being altered and is therefore delayed one digit period in each memory cycle. Moreover, under these conditions said loop is adapted to act as a counter in the way previously explained in the general description, in order to count the adding cycles performed for each digit of the multiplier. More particularly it will be remembered that for having said loop to act as a counter, it is necessary to feed the binary-carry storing bistable device A5 with a counting pulse (that is, to simulate a binary carry) in the bit period in which the minimum-weight bit contained in the counter is fed into the adder. In the present case this bit will be the bit B5 of that decimal digit of the multiplier which is now to be modified by means of the counting pulses. In the present case, when reading the decimal point bit B4="1" of the regitser M, the bistable device A5 is energized to simulate said binary carry, which carry will be fed to the adder 72 concurrently with the first bit B5 of that digit of the multiplier which, having been complemented to 15, is now processed. Therefore the last mentioned digit will be increased one unit during each partial sequence of statuses P40, P10, P50, P60 as well as during each reduced partial sequence of statuses P40, P10, P50.

Therefore, if $n$ is the digit of the multiplier now considered, after $n$ partial sequence P40, P10, P50, P60 said digit of the multiplier will become 15. In the meantime, the computer begins to repeat once more said partial sequence, whereby in the status P10 said digit of the multiplier becomes 16, thus producing a final binary carry R8 coming out from the last bit period T8 of said digit of the multiplier. This carry energizes the bistable device A6, which during the following status P50 will affect both the switching network 36 for preventing the register M from being connected to the adder and the logic circuit 27 for causing said status P50 to be followed by status P40 instead of status P60, whereby the partial sequence of statuses the computer goes through in this case will be the reduced sequence P40, P10, P50 in which the partial product produced in the register N is not altered and the partial product itself along with the multiplier are shifted. Immediately after said binary carry R8 has been produced, the bistable device A5 will be deenergized by the clock pulse T2 so as to clear out said carry stored therein, for preventing said carry from being unduly transmitted to the other denominations of the multiplier, because said other denominations must not be modified in this phase of the multiplication.

It is to be noted that, due to the shifting of the multiplier R during said reduced partial sequence P40, P10, P50, the digit of the multiplier next following the digit just considered is shifted into the denomination corresponding to that denomination of the register M which contains the decimal point of the multiplicand and that said relative alignment of the multiplier with respect to the multiplicand will remain unchanged throughout the following partial sequences P40, P10, P50, P60 until also the partial product of said next following digit and the multiplicand will be computed and accumulated, whereby the decimal point bit $B4=\text{``}1\text{''}$ of the multiplicand M acts as a mark for identifying the digit of the multiplier R which is now to be considered.

From the foregoing it is further apparent that the reduced partial sequence P40, P10, P50 executed after completion of the computation of the partial product relating to the last (least significant) digit of the multiplier R will cause said last digit to be shifted one denomination beyond the decimal point of the multiplicand M. Therefore, in the following status P40, during the digit period wherein the decimal point bit B4 of the register M is read out of the memory LDR, no digit-indicating bit $B2=\text{``}1\text{''}$ will be concurrently read out in the register R. Upon occurence of this circumstance the bistable device A9 will be energized by the reading signal produced by reading out said decimal point bit, whereby the bistable device A9 will affect the logic circuit 27 so as to prevent it from determining as the next following status the status P10. Thus the multiplying operation ends. The next following status will be either the status P17 (extract the next instruction) if the computer is preset for automatic operation or the status P18 (first status of a sequence P18, P19, P22 wherein the multiplicand Y is printed out) if the computer is preset for manual operation.

In a similar way the division is performed according to the repeated subtraction method.

Entering a program through the keyboard

Having preset the commutator 23 so as to produce signal IP ("entering program") the operator sets up on the address keyboard 68 and on the function keyboard 69 the successive instructions of the program to be entered.

Since entering a program via the keyboard into the program registers I and J is similar to entering data via the keyboard into the register M, which operation has been previously described, no further description is deemed to be necessary to those skilled in the art.

After having entered the program into the memory, by actuating a push button AUT the operator may start the automatic execution of said program.

Extracting an instruction

The program having been entered in the memory LDR, actuation of a push button AUT starts the program execution.

The actuation of said button AUT sets the computer in the status P17, in which the switching network 36, beside connecting the input of each memory register to the respective output so as to continuously regenerate its contents, connects the output of the register I or J (or any other instruction register involved in the transfer operation) to the instruction staticisor 16 only during the digit period in which the instruction to be extracted and executed is being read out of the delay line, said digit period being identified by the energization of the bistable device A3.

More particularly, in the first memory cycle occurring during the actuation of said push button AUT, the synchronizing bit $B1R=\text{``}1\text{''}$ which starts the oscillator 45 at the beginning of the first bit period T1 of the first digit period C1 energizes the bistable device A3, which thereafter is deenergized at the end of said bit period T1. Moreover the beginning of the signal AUT energizes the bistable device AI, which when energized, causes the instruction register I to be addressed and selected via the switching network 36, the instruction register J being in turn addressed and selected when said bistable device AI is deenergized. The bistable device AI acts as an address counter to sequentially address the successive instruction registers I, J, since the program is normally executed by first sequentially executing all the successive instructions stored in the register I, then all the successive instructions stored in the register J.

Therefore during said first digit period C1 the output line LI of the instruction register I is connected to the instruction staticisor 16, whereby the eight bits B1 to B8 of the first instruction are written in the eight stages I1 to I8 respectively of the staticisor 16, wherein they are staticized until, after execution of said first instruction, the next following one is extracted.

Moreover in said first digit period C1, as the bistable device A3 is energized, the clock pluse T8 energizes the bistable device A9, which is thereafter deenergized by the next following clock pulse T8. Therefore the bistable device A9 is adapted to identify, by being in its energized state, the digit period next following the digit period of the instruction being now extracted.

As said bistable device A9 is energized, the tag-bit controlling circuit 37 causes a tag bit $B1N=\text{``}1\text{''}$ to be written via gate 91 into the second decimal denomination C2 of the register N, said tag bit B1N being a mark which will be used to identify said next following instruction to be extracted, which in this case is the second instruction.

Moreover, as said bistable device A9 is energized, the clock pulse T1 of sad second digit period C2 energizes the bistable device A6 to indicate that the instruction to be extracted has been recognized and extracted. Therefore, at the end of the memory cycle, the leading edge of the signal A10 causes the gate 83 of the circuit 29 (FIG. 7) to produce a change-of-status timing signal MG which causes the computer to switch to the next following status, this status being identified by the logic network 27 on the basis of the instruction just extracted and staticized. This next following status is the first status of a sequence of statuses during which said instruction is executed.

At the end of the execution of said first instruction, the computer is caused by the sequence control circuit 26 to automatically revert to the status P17, wherein the second instruction is extracted, and so on.

In general, at the end of the sequence of statuses in which the $n^{\text{th}}$ instruction has been executed, the computer automatically reverts to the status P17, under the control of signals indicating the completion of the corresponding operation. In the status P17, which lasts a single memory cycle, the delay line is scanned for searching in the register I or J the instruction to be extracted, which is the ($n+1^{st}$) instruction. Recognition of this instruction is made on the basis of the presence of the tag bit B1N="1" in the ($n+1^{st}$) decimal denomination of the register N. Upon reading out of the delay line said tag bit B1N, the bistable device A3 is energized to identify the digit period in which the instruction to be extracted is delivered at the output of the delay line LDR. Under the control of said bistable device A3, the switching network 36 connects the output of the register I or J to the instruction staticisor 16 only during this digit period. Due to energization of the bistable device A3, the bistable device A9 is subsequently energized to identify the next following digit period $C(n+2)$, whereby in the tag-bit controlling circuit 37 a tag bit B1N="1" is written via gate 91 into said digit period $C(n+2)$, whereby said tag bit is shifted from the ($n+1^{st}$) instruction being at present extracted to the next following ($n+2^{nd}$) instruction to be extracted.

Should the aforesaid $n^{th}$ instruction be the last ($22^{nd}$) instruction of the register I, the bistable device A9, which in any case in the status P17 is always energized during the only digit period next following the digit period of the instruction being at present extracted, will happen to be energized during the first digit period C1, in which the synchronizing bit B1R="1" starting the next following memory cycle is read out of the memory. The concurrence of said two events (energization of bistable device A9, reading out the start bit B1R) causes the instruction-register addressing bistable device A1 to switch so as to be deenergized, whereby in the following statuses P17 the instruction register J instead of I will be addressed and selected. The tag-bit controlling circuit 37 causes as usually a tag bit B1N="1" to be written via gate 91 into the decimal denomination (C1 in the present case) next following the instruction being at present extracted, whereby the first instruction of the register J will be thereafter extracted.

It is thus apparent that the use of a tag bit shiftable along the delay line allows the register I and J to be sequentially scanned for extracting one at a time the successive instructions of the program stored therein, the same tag bit being effective upon reaching the end of an instruction register to advance an instruction-register selecting counter A1 for addressing the next following instruction register.

Jump

According to an embodiment of the invention, in the jump instruction the four bits B5, B6, B7, B8, which are used, as in any other instruction, to represent the function part F12, of the instruction itself, are $$B5=B6=B7=B8="1"$$

The presence of this four-bit combination in an instruction of the program indicates that the instruction itself is concerned with a jump operation during the execution of the program. In this instruction, the bits B1 and B2 represent an address, while the bits B3 and B4 are used to further specify the nature of the instruction.

More particularly, if B3=B4="1," the instruction is not a true instruction, because, upon being entered into the staticisor 16 the instruction does not cause the computer to perform any operation. On the contrary, this instruction is merely a "reference instruction" used as a reference point within the sequence of program instructions, whereby among the 44 instructions of the program stored in the registers I and J it is possible to establish some reference points, each one represented by a reference instruction. There are four different types of reference instructions depending on the value of the bits B1 and B2 of the reference instruction, which bits define the "address" of this reference instruction. Each reference instruction marks the beginning of a subroutine, whereby the reference instructions have the function of marks dividing the program into subroutines.

If B3="0," the instruction is a true jump instruction, the jump being conditional or unconditional depending on whether B4 is equal to "1" or "0."

Each one of said jump instruction, having been extracted from the delay line and staticized in the staticisor 16 during the status P17 of the computer, as any other instruction, causes the computer to switch to the status P23, in which the program registers I, J are scanned to search a reference instruction having the address specified in said staticized jump instruction, that is, having the bits B1 and B2 equal to the corresponding bits of said jump instruction. More particularly, in this status P23 during a first memory cycle the successive instructions stored in the first instruction register I are read out of the delay line and, besides being regenerated, are fed to a comparator, not shown in the drawings and well known in the art. This comparator is adapted to receive each series of eight bits representing an instruction, and to produce an output signal if said instruction is found to be equal to the required reference instruction, that is to have all the bits B3, B4, B5, B6, B7 and B8 equal to "1" and the bits B1 and B2 equal to the bits B1 and B2 of the jump instruction at present staticized.

For instance said comparator may be made of a binary comparator having one input connected to the output of the instruction register at present addressed and selected for receiving said series of eight bits of each scanned instruction and the other input fed by a logic network mechanizing the function $$T1 \cdot I1 + T2 \cdot I2 + T3 + T4 + T5 + T6 + T7 + T8$$

wherein T1 to T8 are the clock pulses produced by the generator 44 and I1 and I2 are the outputs of the two corresponding stages of the instruction staticisor 16, said comparator being adapted to produce an output signal upon receiving at its inputs a pair of simultaneous bits having different values. Said output signal is used to deenergize a bistable device which is energized by the clock pulses at the beginning of each digit period. It is thus apparent that at the end of each digit period this bistable device is energized or not depending on whether the instruction at present scanned coincides with the required reference instruction or not.

If coincidence occurs, said bistable device causes the tab-bit controlling circuit to write a tag bit B1N="1" in the next following decimal denomination to indicate that the next instruction to be extracted (first instruction of the required subroutine) is the instruction stored in said denomination. For the purpose of extracting and staticizing said first instruction of the subroutine, upon detecting said coincidence the computer switches into the instruction-extract status P17, whereby execution of said subroutine begins.

In order to revert to the interrupted main program after completion of said subroutine, it is possible either to put a suitable jump instruction at the end of said subroutine according to a known technique, or to use a tag bit B1U="1" which is recorded in the register U when interrupting said main program, so as to mark the instruction of the register I or J last executed in said main program. For this purpose in the status P17, if a jump instruction is being extracted, contrary to the procedure previously explained, the tab bit B1N="1" is not shifted to the next following decimal denomination of the register N, but instead is transferred into the corresponding denomination of the register U by means obvious to those skilled in the art and not shown in the drawings.

According to a feature of the invention, the reference instructions may be used also in the manual mode of operation for executing certain subroutines. For this purpose the keyboard 22 is provided with four subroutine keys V1, V2, V3, V4, corresponding to the four possible "addresses" of the reference instructions respectively, whereby each subroutine key V1 to V4 has associated therewith an "address" represented by the two bits B1 and B2.

In the manual operation, while the computer is in the status P0 waiting for the setting up of a new datum and a new instruction on the keyboard 22, the operator may push one of said four subroutine keys V1 to V4. Actuation of one of said four keys causes the bits B3=B4="0" and B5=B6=B7=B8="1" to be written into the binary stages I3 to I8 respectively of the instruction staticisor 16 via a circuit not shown in the drawings, and the address bits B1 and B2 corresponding to said key to be written into the stages I1 and I2 respectively. Therefore it is apparent that in the status P0 the actuation of one of the subroutine keys V1 to V4 simulates the extraction of an unconditional-jump instruction from the delay line to the instruction staticisor 16. Moreover actuation of said subroutine key causes the computer to switch to status P23, in that a signal issued from the keyboard directly sets the bistable devices P1 to P$n$ into said status by energizing the bistable device P23 and deenergizing the other bistable devices. As previously explained, in this status P23 the program registers I and J are searched for a reference instruction having the same address B1, B2 of the subroutine key now actuated, and upon finding said reference instruction the computer automatically switches to the status P17 for extracting the first instruction of the subroutine headed by said reference instruction.

As the execution of this subroutine must be automatic, the actuation of the subroutine keys V1, V2, V3, V4 must cause the commutator 23 to switch from the position PM (manual) to the position PA (automatic). Therefore it is apparent that said commutator may be conveniently replaced by a bistable device which is energized upon depressing said subroutine key and deenergized upon terminating said subroutine.

Splitting the memory registers

According to an embodiment of the invention, the registers Q, U, Z, D, E may be split into two parts for storing two short numbers. For this purpose a tag bit B1Z="1" is recorded as a permanent mark in the first binary denomination (bit period) of a fixed decimal denomination (digit period) of the register Z, for instance the denomination C12.

A bistable device, not shown in the drawing, is energized upon reading the synchronizing bit B1R="1" which starts the oscillator 45 at the beginning of each memory cycle and is there deenergized upon reading said fixed tag bit B1Z="1," whereby the bistable device is adapted to identify the first part of each memory cycle and distinguish it over the second part thereof, that is to identify the first part of each memory register and distinguish it over the second part thereof.

Since each instruction contains four address bits B1 to B4, it is possible to use the three bits B2 to B4 for identifying one out of the eight addresses Y1 to Y8 of the eight addressable registers Q, U, Z, D, E, M, N, R, the remaining bit B1 being used for addressing either the first or the second part of the register concurrently addressed by said three bits B2 to B4.

The splittable registers Q, U, Z, D, E are never directly involved in arithmetic operations. Otherwise stated, their contents (apart from the tag bits B1) is never directly modified, in each memory cycle these contents being either regenerated without modification or transferred to or from the registers M or N.

Therefore each one of the two parts of each register Q, U, Z, D, E may be addressed and selected by the switching network 36 under the control of the address bit B1 at present staticized in the instruction staticisor 16. More particularly, if said staticized bit is B1="1," the switching network 36 connects the splittable register Q, U, Z, D or E at present addressed by the staticized instruction to either the register N or the register M (depending on the function part of said staticized instruction) only when said bistable device is energized, whereby the transfer operation is performed only to or from the first part of said splittable register, whereas if said staticized bit is B1="0" the connection is effected only when said bistable device is deenergized, whereby the transfer operation is performed only to or from the second part of the splittable register.

It is obvious that any transfer operation to and from a selected part of a splittable register must be preceded by suitable aligning operations performed on the number stored therein.

In the embodiment considered in the general description, each address key was effective, when actuated, to enter four address bits B1 to B4 into the computer. In another embodiment each address key is effective to enter only the three address bits B2 to B4 used to address a register, a separate split key being provided for entering the remaining address bit B1, whereby any part of any splittable register may be normally addressed through the keyboard.

In an alternative embodiment, the address bit B1 may be effective, depending on its value, to cause the transfer operation to begin upon reading either the start bit B1R (beginning of the memory cycle) or the tag bit B1Z (beginning of the second half of the memory cycle), in both cases the transfer operation being continued until the end of the cycle.

In another preferred embodiment of the invention, the memory cycle lasts 24 digit periods instead of 22 as heretofore described, each register being able to store either a 22-digit number or two 11-digit numbers. In this case the digit periods C12 and C24 are void, in order to give the computer sufficient time to detect overflow during the arithmetic operations. This arrangement entails modifications which are obvious to those skilled in the art. It is to be pointed out that the lengthening of the memory cycle to 24 digit periods involves only a modification of the number written into the register K at the beginning of the start-computer status P21, because, due to the use of the tag bits in the delay line, no digit counter is used in the normal operation of the computer.

Program card

According to an embodiment of the invention, the computer is provided with a device for recording and reading data and instructions on record cards, for instance magnetic cards.

It has been previously explained how the data and the program instructions may be set up on the keyboard and stored into the delay line registers.

Having been so stored in the computer via the keyboard, the data and the program are made available for controlling the computer.

Moreover said data and instructions having been set up on the keyboard may be read out of the delay line and recorded on a card for subsequent use, whereby the operator may prepare a card file for subsequent use.

According to a feature of the invention, each card has sufficient capacity to store at least an entire program. Otherwise stated, it has a capacity not less than the program registers of the computer.

In a preferred embodiment, the card may store the contents of the five memory registers I, J, Z, D, E. The registers I and J are permanently allotted to store program instructions. Each one of the registers Z, D, E, being splittable, may contain either a 22-digit number or two 11-digit numbers or 24 program instructions or a 11-digit number and 12 program instructions, whereby according to the present embodiment of the invention also the registers Z, D, E, may be used, either partially or totally, as program registers.

The storage capacity of a card being related to the storage capacity of the program registers in the above manner, it is apparent that by merely reading a card into the computer the operator may have immediately available any desired program, the only operation required being inserting the card into the reading unit. This gives substantial advantages especially in the manual mode of operation. As a matter of fact, since the operator in the manual operation may institute by means of the subroutine keys V1, V2, V3, V4 the automatic execution of any subroutine, by merely introducing a properly coded card and then pushing a subroutine key the computer may be caused to perform any desired operation, whereby the computer may be regarded as being provided with an unlimited number of function keys.

Otherwise stated, the computer comprises, besides the function keys of the keyboard 69, four function keys V1 to V4 whose function may be changed by associating therewith a different program card.

More particularly each subroutine key has a fixed four-bit code combination associated thereto and corresponding to a certain setting of the code bars in the keyboard decoder. Actuation of said key causes the computer to search the program registers for a reference instruction having the same code of said key. Upon finding said reference instruction, which marks the beginning of a program subroutine, the computer begins to execute said program subroutine. If said code combination is used to identify in the program stored on a first card a subroutine controlling the computation of the sine and in the program stored on a second card a subroutine controlling the computation of the cosine, for instance, then said key will be given the meaning of "sine key" and "cosine key" upon reading into the computer said first card and said second card respectively.

Therefore by first manually entering for instance said first card into the computer and then depressing said subroutine key, the sine of a datum either previously set up on the keyboard or previously entered on the memory LDR and now addressed via the keyboard is computed.

Each card 150 is made (FIGS. 9 and 10) of a flexible sheet having on at least one face a strip of magnetizable material which constitutes a recording track, the opposite face being adapted to bear visible designations pertaining to the information recorded in coded form on said recording track.

The path for the card is defined by a pair of guides 144, 115 between an inlet opening 113 and outlet opening 144 of the computer frame.

Two driving rollers 116, 117 are located along said path for cooperating with pressure rollers 118, 119 respectively in order to feed the card along said path.

The driving rollers 116, 117 are connected, by gear means not shown in the drawings, to a motor 120, which is also adapted to drive the movable parts of both the printing unit 103 and the keyboard decoder 101.

The pressure roller 119 is pivoted on oscillating arms 121 journalled to an axis 122 and spring urged against the roller 117.

Also pivoted around said axis 122 is an eccentric hub 124 on which an oscillating arm 123 is mounted. Arm 123 bears a read-write magnetic head 129 spring urged against roller 117.

By rotating the eccentric hub 124 through an adjusting screw the position of the head along the path of the card may be adjusted.

Arms 125, 126 also pivoted around axis 122 have journalled thereto a first sensing roller 126 lying before the magnetic head along the card path and a second sensing roller 128 respectively, lying beyond the magnetic head.

The sensing rollers 126 and 128 are urged by springs 130, 132, toward the path of the card, whereby when card is absent they partially enter two corresponding openings of the guides 114 and 115 so as to lie in said path, to an extent limited by an abutment 131 which engages the end of an adjusting screw 133, 134 born by said arms respectively.

The card 150, upon passing under the sensing rollers 126, 128 causes them to be raised, so as to counter-clockwise rotate the arm 125, 127 respectively.

An arm 135 also pivoted around axis 122 is provided with a first projection 136 adapted to engage the actuating button of an electrical switch 137 against which it is urged by a spring 139 and with a second projection 138 adapted to engage corresponding projections 140, 141 of the arms of the sensing rollers 126, 128 respectively, whereby when at least one sensing roller is at rest (that is, does not lie in the card path the corresponding projection 138, keeps the arm 135 rotated in the clockwise direction, because the spring 130, 132 respectively, overcomes the spring 139.

On the contrary, when both the sensing rollers are raised by the card, the arm 135 is free to rotate counter-clockwise, whereby its projection 136 is allowed to actuate the switch 137.

The card 150, having been manually introduced into the inlet opening 113, is engaged by the first pair of rollers continuously rotating 116, 118 and pushed toward the second pair of continuously rotating rollers 117, 119, which causes the card to advance past the magnetic head 129 at substantially constant speed. The first sensing roller 126 is raised upon been reached by the leading edge of the card. However, as the second sensing roller remains in the rest position, the arm 135 remains in its clockwise position, whereby the projection 136 is prevented from actuating switch 137 until the second sensing roller 128, upon being reached in turn by said leading edge, is raised.

When, thereafter, the trailing edge of the card reaches the first sensing roller 126, the arm 125 rotates clockwise pushing the arm 135 in the same direction, whereby the switch 137 is disengaged. Therefore the switch 137 is adapted to generate an electric signal A0 beginning when the leading edge of the card reaches the second sensing roller 128 and ending when the trailing edge of the card reaches the first sensing roller 126, so as to identify the time interval during which the good part of the track 151 passes under the mangetic head 129.

At the end of its path the card 150 is disengaged from the pair of rollers 117 and 119, whereby it is stopped by friction in such a position that its leading edge projects out of the outlet opening 144 so as to allow manual extraction. In this end position a predetermined portion of the card adapted to bear visible designations pertaining to the information recorded in code form thereon lies under an opening 142 of the computer cover, in front of the subroutine keys V1, V2, V3 and V4.

More particularly each card may bear on the position facing a subroutine key a brief written statement or symbol of the operation performed by the computer under the control of the program subroutine which in the program is headed by the reference instruction having the same code of said key. Therefore, with reference to the previously cited example, the subroutine key will be labelled "sine" and "cosine" when the first card and the second card respectively is inserted in the computer.

The keyboard 100, the printing unit 103 and the card handling unit are three independent mechanical groups fixed to the frame 148 which may be counter-clockwise rotated (FIG. 9) around an axis 143, whereby all the mechanical parts of the computer may be raised as block for inspection and maintenance.

According to an embodiment of the invention, the card 150 is provided with a single magnetic track 151 for storing the entire contents of five registers of the memory LDR.

On the track 151, the eight binary denominations of each character are followed by four blank denominations, whereby each character, as recorded on the card, comprises twelve denominations.

Therefore, assuming each memory register containing 24 digits, the track 151 contains an uninterrupted series of 12·24·5=1440 binary denominations, among which only 960 contain bits to be transferred into the memory registers.

The card 150, having been introduced manually in the inlet opening 113, advances at constant speed past the magnetic head 129, whereby the 1440 binary denominations of the mangetic track 151 are scanned at a constant frequency in the same direction both when reading and when recording.

When reading the card, each group of eight bits read on the card and representing a character is stored in the shift register K. While the magnetic head scans the four next following blank denominations, said eight bits are transferred from the register K to the memory register at present addressed.

Similarly, when recording on the card, while the magnetic head scans a group of four blank binary denominations, a character is transferred from the memory register at present addressed to the register K; when, thereafter, the magnetic head scans the eight next following binary denominations, said character is extracted from the register K and recorded on the card.

More particularly, according to an embodiment of the invention the card moves at such a speed, that its successive binary denominations are scanned at 0.6 millisecond intervals, a memory cycle being 2.1 milliseconds long, whereby the time consumed in scanning the four blank denominations is sufficient for having access to whatsoever decimal denomination of the delay line in order to enter therein or extract therefrom a certain character. Therefore it is apparent that the blank space separating two contiguous characters on the card corresponds to a time interval greater than the access time of the delay line memory, whereby the successive characters may be sequentially transferred to and from the card, serially by bit, through a buffer storage (register K) having a single character capacity, thus substantially reducing the cost of the apparatus.

According to another feature of the invention in each group of four blank binary denominations of the card at least one is used to store check bits associated with the character recorded in the eight contiguous binary denominations, said check bits being computed when recording the card and used and destroyed when reading the card.

Moreover all the binary denominations of the card, included the blank denominations, are counted when scanning the card to ascertain that none has been skipped or read more than once.

FIGS. 11a and 11b show some parts of the circuits of the computer involved in the card processing operation.

The normally open switch 137 is closed when the card 150 engages both sensing rollers 126 and 128, so as to energize one input of both gates 218 and 219 (FIG. 11a).

A commutator 205 is manually actuated by the operator for preselecting either the card reading operation or the card recording operation by energizing the other input of gate 218 or 219 respectively.

Therefore while reading and recording on the card the terminal AL, AS respectively, generates a signal lasting the entire time interval spent by the magnetic head 129 in scanning the track 151.

The magnetic head 129 is connected to a reading-recording amplifier 206.

According to an embodiment of the invention, the magnetic flux in the magnetic track 151 exhibits (line NL of FIG. 12) a series of reversals or transitions, called clock flux transitions, spaced a distance corresponding to 600 microseconds, the zone between two contiguous clock flux transitions constituting a binary denomination of the card. Each bit "1" or "0" is represented by the presence and the absence respectively, of a flux transition, called information flux transition, spaced a distance corresponding to 200 microseconds from the clock flux transition which marks the beginning of the corresponding binary denomination. Said flux distribution is produced by a signal having a similar wave form and fed to the input 207 of the amplifier 206 via a gate 209 from a bistable device NL, which when recording is fed with the binary signals issued by the register K and serves the purpose of shaping said signals as required for modulating the magnetic flux. On the output 208 of the amplifier 206 a short pulse LS is obtained upon reading each clock flux transition, and each information flux transition. The signals LS produced by sensing the information flux transitions, having been discriminated by a gate 228 and reshaped by a bistable device NH, are fed into the register K via the gate 230.

An oscillator OR, which is operative only when the signal AS indicating that the track 151 is being scanned for recording is present on its input, produces on its output a train of pulses OR (FIG. 12), each one 200 microseconds long and having a 600 microseconds repetition period. Moreover, through differentiating circuits 211 and 212 the oscillator OR produces a short pulse ORF, ORC respectively, at the leading edge, trailing edge respectively, of each pulse OR.

Each pulse ORF starts a monostable circuit OS having a 400 microseconds inherent delay, whereby the monostable circuit OS produces on its output a series of pulses, each one 400 microseconds long, at 600 microseconds intervals. Moreover, via differentiating circuits 214 and 213 a short pulse OSF, OSC respectively, is produced at the leading edge, trailing edge respectively, of each pulse OS.

On the contrary, when signal AL is present to indicate that the track 151 is being scanned for reading, the oscillator OR is inoperative, and the monostable circuit OS is started via a gate 215 by each signal produced by the amplifier 206 upon reading a clock flux transition.

The pulses OSF are used as counting pulses for advancing a modulo-twelve counter 216, so as to energize an output H1–8 when the magnetic head scans the first eight binary denominations of each character on the card, the output 119 when scanning the ninth binary denomination of each character on the card and the output $\overline{H12}$ when scanning all denominations but the twelfth (last) denomination of each character.

Both when reading and when recording, the pulses OSC are used as shift pulses for the register K, whereby upon receiving a pulse OSC on the input 4 via gate 217 the contents of the register K are shifted one binary denomination leftward.

Therefore it is apparent that when reading the card, the bits are shifted in the shift register K in synchronism with the scanning of the card, since the monostable circuit OS is then fed with the signals produced by the reading amplifier 206, and that when recording the bits are shifted in the shift register K in synchronism with the scanning of the card because the recording process is timed by the oscillator OR which also controls the monostable circuit OS.

The input 13 of the register K is connected via gate 221 to the output LI, LJ, LZ, LD, LE of the register I, J, Z, D, E of the memory LDR respectively when recording. Similarly, when reading the card the output 14 of the register K is connected via gate 231 to the input SI, SJ, SZ, SD, SE of said registers respectively.

Said registers are addressed by means of gates 200, 201, 202, 203, 204, and 234, 335, 236, 237, 238.

The operation of the computer when recording on a card will be now briefly described.

When the commutator 205 is preset in the "recording" position, so as to produce the signal AS0, the leading edge of this signal energizes the bistable device A7 (FIG. 11b), which serves the purpose of indicating that from that moment a character may be transferred from the memory LDR to the register K. Upon completion of this transfer operation, the bistable device A7 is deenergized, for preventing the other characters from being unduly transferred.

The first character transferred is the character stored in the first decimal denomination of the register J. The trailing edge of the signal A10 (stop oscillator 44) via gate 220 energizes the bistable device A9, which is thereafter deenergized by the next following clock pulse T1, which in this case occurs in the first bit period of the first digit period of the new memory cycle. Said pulse T1 energizes the bistable device A3, which thereafter remains energized during the entire first digit period, for indicating that in said digit period the character to be transferred is delivered on the output of the delay line.

More particularly, the bistable device A3 when energized opens gate 221, whereby the eight bits of the first character extracted from the delay line via the gate 235 are transferred into the register K, and further opens gate 222, whereby the register K receives a train of eight shift pulses M4, one in each bit period, with the frequency of the signals in the delay line. Therefore said eight bits are shifted into the register K and thereafter stored therein until recording on the card. After said digit period, the bistable device A3 is deenergized by the clock pulse T1, thus deenergizing also the bistable device A7. During the digit period identified by the bistable device A3 being energized, in the tag-bit control circuit a tag bit $B1M=$"1" is written into the register M via gate 225. Said tag bit is adapted to thereafter indicate, what is the character last transferred from the delay line LDR to the register K.

In the meantime the operator inserts the card into the computer, whereby when the track 151 begins to be scanned by the head 129, the switch 137 generates the signal AS.

The presence of this signal makes the oscillator operative. The first pulse OSF produced by the oscillator OS advances the counter 216 so as to energize its output H1-8 and switches the bistable device NL, whereby the amplifier 206 records on the card the first flux reversal, that is the clock flux transition marking the beginning of the first binary denomination 200 microseconds later, the oscillator OR produces a first signal OSC which via gate 223 either energizes the counting input 210 of the bistable device NL or not depending on whether the first bit of the character, being now retained in the output stage K1 of the register K, has the value 1 or 0. In FIG. 12 the first and second characters have been assumed to be 1, 0, 0, 1, 0, 1, 0, 0 and 0, 1, 0, 0, 0, 1, 0, 0 respectively. Via gate 209 and amplifier 206, the output signal of the bistable device NL is recorded on the card. 200 microseconds later, the oscillator OR produces a first signal OSC, which through gate 217 causes the contents of the register K to be shifted one stage, whereby the second bit of the character to be recorded on the card is shifted into the output stage K1.

200 microseconds later, the oscillator OR produces a second pulse OSF, which steps the counter 216 and switches the bistable device NL, whereby the second clock flux transition is recorded on the card. 200 microseconds later, the oscillator OR produces a second pulse ORC, which through gate 223 causes the bistable device NL either to switch or not depending on whether the bit now retained in the output stage K1 is 1 or 0. In FIG. 4 this bit is 0. 200 microseconds later, the oscillator OR produces a second pulse OSC, which through gate 217 shifts the contents of the register K, whereby the third bit is shifted into the output stage K1. Said third bit and the following five bits are similarly recorded on the card.

The ninth pulse OSF deenergizes the output H1-8 of the counter 216 and energizes the output H9.

The signal H1-8 being absent, gates 217 and 223 are closed, register K receives no more shift pulses from the oscillator OR and the connection of its output 14 to the magnetic head 129 is interrupted.

The trailing edge of signal H1-8 via gate 224 energizes the bistable device A7. Therefore the reading signal LB1M, produced upon reading the tag bit B1M out of the delay line, is allowed to energize the bistable device A9 via gate 226. Bistable device A9 when energized identifies the digit period next preceding the character to be transferred from the delay line LDR to the card, moreover it causes the bistable device A3 to be energized for identifying the digit period in which the character to be recorded on the card is read out of the delay line.

The bistable device A3 being energized opens gates 221 and 222, whereby during only said digit period the memory LDR is connected to the register K, which in turn receives eight shift pulses M4 at the frequency of the pulses in the delay line.

Therefore the second character of the register J is transferred into the register K. In the meantime the oscillator OR remains operative, whereby the ninth pulse ORC causes the bistable device NL to be either switched or not via gate 227 depending on whether said bistable device NL is energized or not, whereby a new flux transition is either recorded or not on the card to make the total number of transitions recorded in the first nine denominations equal to an even number. Otherwise stated, said new flux transition represents a parity bit.

On the contrary, in the following (tenth, eleventh, twelfth) denominations, only the clock flux transition is recorded.

The thirteenth pulse OSF reenergizes the output H1-8 of the counter 216, whereby gates 223 and 217 are opened again in order to connect the register K to the magnetic head and to shift the second character out of the register K to the card itself.

The following characters are recorded in a similar manner.

The card reading operation will now be briefly described (FIG. 12b).

Upon introducing the card in the computer, the first clock flux transition is sensed and produces a reading signal LS which starts the monostable circuit OS via gate 215. Therefore a first pulse OSF is produced, whereby counter 216 is stepped to energize output H1-8. This causes gate 217 to be opened for feeding the register K with a train of eight shift pulses OSC having a frequency controlled by the clock flux transitions recorded on the card.

The monostable circuit remains energized 400 microseconds, whereby during this interval the reading signal LS representing the first bit is fed via gate 228 to energize the bistable device NH, whose output will thus represent said bit being now read on the card.

The output signal of the bistable device NH is fed via gate 230 to register K, whereby, upon receiving the first shift pulse OSC via gate 217, said bit having been read on the card is transferred into the stage K8. About 200 microseconds later, the second clock flux transition is read on the card, whereby a signal LS starts the monostable circuit OS again. Therefore a second signal OSF is produced for stopping the counter 216 and resetting the bistable device NL.

Moreover the signal OS by opening the gate 228 discriminates the time interval during which the information flux transition representing the second bit may occur. Said second bit is therefore staticized in the bistable device NH and then transferred into stage Ku. In a similar manner the following six bits of the first character are read on the card. Upon reading the ninth clock flux transition, the ninth pulse OSF causes the counter 216 to advance so as to energize output H9 and deenergize output H1-8. Therefore the gate 217 is closed for preventing the register K from being fed with shift pulses having the frequency of the signals read on the card.

The trailing edge of the signal H1-8 energizes via gate 224 the bistable device A7 to indicate that at present the register K must be connected to the delay line LDR for transferring the first character into the register J. Said trailing edge may occur at any point of a memory cycle. At the end of this cycle, the bistable device A9 is energized via gate 220 in the manner previously explained for the recording operation, whereby at the beginning of the next following memory cycle (beginning of the first digit period C1) the bistable device A3 is energized to identify the digit period C1 as the digit period in which the character is to be transferred.

More particularly the bistable device 1A3 being energized opens gates 231 and 222 to connect the register K to the memory LDR and to feed the register K with a train of eight shift pulses M4 synchronized with the pulses in the delay line, whereby the first character is written into the first denomination of the register J.

In the card reading phase, the bistable device NL receives every signal OSF produced upon sensing a clock flux transition and every signal issued by the gate 228 upon sensing an information flux transition.

Therefore the bistable device NL when reading the card gives a replica of the signal which had been fed to the input 207 of the amplifier 206 when recording. When scanning the end of the ninth binary denomination of the card (signal H9 is present, signal OS is absent) the bistable device NL must be energized, because it must have made nine non significant commutations and an even number of significant commutations. If on the contrary the bistable device remains then deenergized, the output of a gate 232 is energized to provide an error signal ERL.

In a similar manner the following characters are read on the card.

At the end of the reading operation, when the signal AL has disappeared, counter 216 must have its output H12 deenergized, since a multiple of twelve denominations should have been scanned on the card.

If this condition does not occur, the output of a gate 233 is energized to produce an error signal ERL.

As shown in FIG. 11a, when reading the card, the output of the shift register K is connected to the input of the register I, J, Z, D, E via gate 200, 201, 202, 203 and 204 respectively when reading the first, second, third, fourth, fifth group of 24 characters recorded on the card respectively.

For this purpose said five gates are sequentially opened by address signals produced by the address decoder 17. According to an embodiment of the invention, the instruction staticisor 16 is also used as address register for sequentially addressing said five registers in the card reading phase.

As shown in FIG. 11a, in this phase (signal AL is present) the register I and J, which cannot be addressed by the address signals Y1 to Y8 issued by the decoder 17 and allotted to the normally addressable register M, N, R, Q, U, Z, D, E, are addressed by the address signals $Y1 \cdot AL$ and $Y2 \cdot AL$ respectively.

Since the registers I, J, Z, D, E involved in the card reading operation must be addressed sequentially, means must be provided for causing the address decoder 17 to sequentially generate the corresponding address signals Y1, Y2, Y6, Y7, Y8. To this end the instruction staticisor 16 is conditionable by the signal AL (card reading phase) to act as a counter having suitable internal feedback connections for generating said sequence of address signals upon receiving successive counting pulses. Alternatively, the code representation of said addresses may be selected in such a way that by entering a certain group of bits into the instruction staticisor 16 working as a shift register and then shifting said bits, the successive address signals are generated.

Each counting pulse for stepping the decoder 17 from an address to the next following address is generated when filling up a register with the characters read on the card is completed.

More particularly, when reading on the card the last (24th) character to be entered in the register J, the tag bit B1M (which is shifted along the delay line to mark the denomination in which the next following character must be entered) will be in the last decimal denomination. This means that the register J has been filled up and that register 1 may be subsequently addressed. As previously explained, the bistable device A22 is energized during the last digit period of each memory cycle. Therefore a signal indicating the coincidence of the signals A22 and A3 is used as a counting signal for stepping said instruction staticisor to generate the address of said next following register J.

It is thus apparent that the instant in which the next following register must be addressed is determined without counting the number of transferred characters, whereby an expensive character counter is dispensed for.

In a similar manner the memory registers are addressed when recording on the card.

According to an embodiment of the present computer (FIGS. 9 and 10), the keyboard 101, comprises a slide 160 for each key having code slots corresponding to the code of said key. Upon depressing said key, the corresponding code slide 160 is moved by the motor 120 rightward (FIG. 9), whereby seven code bars 161 to 167 are positioned according to said code. Each code bar in turn causes a separate code slide similar to the slides 160 to be moved rightward so as to actuate a corresponding switch 102. Therefore the code bars 161, 162, 163, 164 produce four binary signals representing the depressed key. The code bars 165 and 166 produce a pair of signals which are combined to obtain the signals G1, G2 and G3 indicating whether the numeric keyboard 65 or the address keyboard 68 or the function keyboard 69 has been operated. The code bar 167 provides a strobe signal for the computer upon actuating any key. Moreover the slides 160 associated with some keys, for instance the minus key and the decimal point key, are adapted to directly actuate a corresponding separate switch 102.

The serial printing unit 103 comprises a fixed type drum 104 and a traveling printing hammer 105 for printing on a paper roll 106.

The back part of the computer comprises the electronic circuit modules 107 mounted on printed circuit cards 108 interconnected by means of edge connectors 109 and printed circuit cards 110. A box 112 contains the delay line LDR.

We claim:

1. A program controlled electronic computer comprising:
    (a) means for storing a program comprising a series of instructions including normal instructions and jump instructions, and also comprising marks for designating program subroutines, each one of said jump instructions corresponding to at least one of said marks,
    (b) means for selecting one of said instructions,
    (c) means responsive to said selecting means upon selecting one of said normal instructions for controlling said computer to perform predetermined operations,
    (d) means effective upon completion of said operations for conditioning said selecting means to select the next following instruction in said series, and
    (e) means responsive to said selecting means upon selecting one of said jump instructions for sequentially searching said program and for conditioning said selecting means, upon finding a mark corresponding to said selected jump instruction, to select the first instruction of the corresponding subroutine.

2. A program controlled electronic computer comprising:
    (a) means for storing a program comprising a series of instructions including normal instructions, jump instructions and reference instructions, each one of said reference instructions heading a program subroutine, and each one of said jump instructions corresponding to at least one of said reference instructions, (b) means for selecting one of said instructions, (c) means responsive to said selecting means upon selecting one of said normal instructions for controlling said computer to perform predetermined operations, (d) means effective upon completion of said operations for conditioning said selecting means to select the instruction next following said selected normal instruction in said series, and (e) means responsive to said selecting means upon selecting one of said jump instructions for sequentially searching the instructions of said series and for conditioning said selecting means, upon finding a reference instruction corresponding to said selected jump instruction, to select the instruction next following said selected jump instruction in said series.

3. A program controlled electronic computer comprising:

(a) means for storing a program comprising a series of instructions, (b) an instruction register, (c) means controlled by said stored program for transferring a predetermined instruction from said program storing means to said instruction register, (d) means automatically operative upon entering an instruction into said instruction register for executing said last mentioned instruction, and (e) a set of control keys for entering an instruction into said instruction register.

4. A program controlled electronic computer comprising:

(a) means for storing a program comprising a series of instructions, (b) means for indicating an instruction, (c) means controlled by said stored program for transferring a predetermined instruction from said program storing means to said instruction indicating means, (d) means responsive to said indicating means for executing said indicated instruction, and (e) control keys conditionable for entering an instruction into either said indicating means or said program storage means.

5. A program controlled electronic computer comprising:

(a) means for storing a program comprising a series of instructions including normal instructions and jump instructions, each one of said jump instructions designating a corresponding subroutine in said stored program, (b) means for indicating an instruction, (c) means responsive to said indicating means upon indicating one of said normal instructions for controlling said computer to perform predetermined operations, (d) means effective upon completion of said operations for conditioning said indicating means to indicate the instruction next following said normal instruction in said series, (e) means responsive to said indicating means upon indicating one of said jump instructions for controlling said computer to execute the subroutine designated by said jump instruction, and (f) subroutine keys operable for causing said indicating means to indicate predetermined ones of said jump instructions respectively.

6. A program controlled electronic computer comprising:

(a) means for storing a program comprising a series of instructions, (b) an instruction register, (c) sequence control means, (d) means controlled by said sequence control means for executing an instruction contained in said register, (e) means controlled by said sequence control means and operative upon completion of the execution of said instruction for transferring a predetermined instruction from said program storing means to said instruction register, (f) and a set of control keys for manually entering an instruction into said instruction register.

7. A program controlled electronic computer comprising (a) storage means, (b) a plurality of subroutine keys, (c) means for reading and entering into said storage means at least one subroutine recorded on a record member, each subroutine having associated therewith a designator, each designator corresponding to a separate one of said subroutine keys, the actuation of a subroutine key being effective to select from said storage means the entered subroutine having associated therewith the corresponding designator and (d) means responsive to the actuation of a subroutine key for causing the computer to automatically execute the selected corresponding subroutine.

8. An electronic computer controlled by a program including a plurality of subroutines, comprising:

(a) a plurality of subroutine keys, each one corresponding to one of the subroutines of said program;

(b) means for receiving a record member;

(c) means for reading the record member entered into said receiving means;

(d) said record member having recorded thereon said program, and having portions bearing visible designations of the subroutines of said recorded program respectively;

(e) means fed by said reading means for storing said program;

(f) means for holding said entered record member with said portions lying in visual correspondence with the corresponding subroutine keys respectively;

(g) and means responsive to actuation of said subroutine key for causing the computer to automatically execute the corresponding stored program subroutine.

9. A generally desk-top size program controlled electronic computer comprising:

(a) memory means having a plurality of addressable locations for storing both data and a program comprising a series of instructions for operating the computer;

(b) a plurality of record members each having recorded thereon a program and each having associated therewith a visible designation for indicating the program recorded thereon;

(c) record processing means including:
   (1) record receiving means, and
   (2) means settable for automatically reading by scanning an individual one of said record members inserted into said record receiving means in a single scanning operation and for entering the program so read into a portion of said memory means with programs from successive record members superimposed on instructions previously stored in said portion of said memory means;

(d) means for serially reading said entered instructions from said portion of said memory means, and (e) means responsive to the instructions read from said memory means for selectively performing arithmetic and logical operations on the data stored in selected locations in said memory means.

10. The program controlled electronic computer of claim 9 further comprising:
- (a) a keyboard including a set of control keys for controlling said computer and
- (b) means for drawing said received card along a curved path passing below said keyboard, the entrance and exit of said path being substantially coplanar with said keyboard.

11. The apparatus of claim 9, further including control keys operable when actuated to record different instructions into said memory means, said said processing device being operable to record onto a record card inserted into its receiving means a series of instructions recorded in said memory means.

12. A program controlled electronic computer comprising:
- (a) a storage for storing at least one series of instructions,
- (b) control keys for entering instructions into said storage,
- (c) means for selectively reading said instructions from said storage for controlling the operation of said computer, and
- (d) record processing means including:
  - (1) means for receiving individual manually insertable record members,
  - (2) read-write means for transferring information between said storage and said record members and,
  - (3) means settable by an operator for selectively controlling the direction of the transfer of said information.

13. In a data processing apparatus:
- (a) a storage having an access time,
- (b) a buffer memory having a storage capacity of a predetermined number of bits,
- (c) means for scanning individual record members bearing at least one track of digitally coded information arranged in groups of bits, each of said bits of a group being separated from adjacent bits by a distance corresponding to an interval between scanning adjacent bits which is less than said access time, each said group containing a number of bits whose maximum is equal to the capacity of said buffer memory, adjacent groups being separated by a distance corresponding to an interval between scanning the last bit of one group and the first bit of the next group which is at least as great as said access time, and
- (d) means for writing the bits of each group of said scanned information into said buffer memory while that group is being scanned and for transferring each group to said storage during scanning of the distance separating adjacent groups.

14. The apparatus of claim 13 further comprising checking means associated with said scanning means for counting said scanned bits including bits recorded between said groups.

15. The apparatus of claim 13 having check bits recorded between said groups for checking the contiguous groups.

16. A generally desk-top size program controlled electronic computer comprising:
- (a) memory means having addressable locations for storing data to be processed and a program comprising a series of instructions for controlling the operation of said computer;
- (b) record processing means, including:
  - (1) record receiving means; and
  - (2) means settable for automatically reading by scanning in a single scanning operation an individual manually insertable record member containing a program inserted into said record receiving means and for entering the program so read into a portion of said memory means, with programs from successive record members superimposed on instructions previously stored in said portion of said memory means;
- (c) means for serially reading said instructions from said portion of said memory means; and
- (d) means responsive to the reading of said instructions from said memory means for selectively performing arithmetic and logical operations on the data stored in selected locations of said memory means.

References Cited

UNITED STATES PATENTS

| | | | |
|---|---|---|---|
| 2,883,106 | 4/1959 | Cornwell et al. | 235—61.6 |
| 3,031,136 | 4/1962 | Blumenthal et al. | 235—61.11 |
| 3,037,698 | 6/1962 | Saxenmeyer | 235—153 |
| 3,145,920 | 8/1964 | Berlinsky et al. | 234—55 |
| 3,150,351 | 9/1964 | Tackovich | 340—172.5 |
| 3,187,321 | 6/1965 | Kameny | 340—345 |
| 3,292,155 | 12/1966 | Neilson | 340—172.5 |
| 3,355,714 | 11/1967 | Culler | 340—172.5 |
| 3,201,759 | 8/1965 | Kelly | 340—172.5 |
| 3,335,265 | 8/1967 | Apfelbaum | 235—61.11 |
| 3,353,163 | 11/1967 | Soule et al. | 340—172.5 |
| 3,360,781 | 12/1967 | Boehnke | 340—172.5 |

OTHER REFERENCES

Buchholz: "The System Design of the IBM 701 Computer," Proceedings of the I.R.E., October 1953, pp. 1262–1275.

Design Features of the "Jaincomp-c and Jaincomp-d Electronic Digital Computers," Convention Record of the I.R.E., vol. 2, 1954, part 4 (Electronic Computer), pp. 98–104.

RAULFE B. ZACHE, Primary Examiner

U.S. Cl. X.R.

235—61.6

Disclaimer 3,495,222.—*Pier Giorgio Perotto*, Turin, and *Giovanni De Sandre*, Sacile, Italy. PROGRAM CONTROLLED ELECTRONIC COMPUTER. Patent dated Feb. 10, 1970. Disclaimer filed Mar. 17, 1971, by the assignee, *Ing. C. Olivetti & C., S.p.A.*

Hereby enters this disclaimer to claims 3, 4 and 6 of said patent.

[*Official Gazette June 29, 1971.*]